US012390871B2

(12) United States Patent
Mansour et al.

(10) Patent No.: US 12,390,871 B2
(45) Date of Patent: Aug. 19, 2025

(54) SYSTEM AND METHOD FOR CONTROLLING A WIRE ELECTRIC DISCHARGE MACHINE

(71) Applicants: Mitsubishi Electric Research Laboratories, Inc.; Mitsubishi Electric Corporation, Tokyo (JP)

(72) Inventors: Hassan Mansour, Cambridge, MA (US); Petros Boufounos, Cambridge, MA (US); Shigeru Takushima, Tokyo (JP); Nobuyuki Ota, Tokyo (JP)

(73) Assignees: Mitsubishi Electric Research Laboratories, Inc., Cambridge, MA (US); Mitsubishi Electric Corporation, Tokyo (JP)

( * ) Notice: Subject to any disclaimer, the term of this patent is extended or adjusted under 35 U.S.C. 154(b) by 552 days.

(21) Appl. No.: 17/930,097

(22) Filed: Sep. 7, 2022

(65) Prior Publication Data

US 2024/0082936 A1 Mar. 14, 2024

(51) Int. Cl.
*B23H 7/20* (2006.01)
*B23H 7/10* (2006.01)
*G06T 5/50* (2006.01)
*G06T 5/94* (2024.01)
*G06V 10/145* (2022.01)

(52) U.S. Cl.
CPC ............ *B23H 7/20* (2013.01); *B23H 7/10* (2013.01); *G06T 5/50* (2013.01); *G06T 5/94* (2024.01); *G06V 10/145* (2022.01)

(58) Field of Classification Search
None
See application file for complete search history.

(56) References Cited

U.S. PATENT DOCUMENTS

| 10,646,939 | B2 | 5/2020 | Nakagawa et al. | |
|---|---|---|---|---|
| 10,974,333 | B2* | 4/2021 | Hiraga | B23K 7/06 |
| 2018/0326523 | A1* | 11/2018 | Tomioka | B23H 7/20 |

(Continued)

OTHER PUBLICATIONS

Mu-Tian Yan et al, Accuracy improvement of wire-EDM by real-time wire tension control, 2004, pp. 1-8 (Year: 2004).*

(Continued)

*Primary Examiner* — Howard Cortes
(74) *Attorney, Agent, or Firm* — Gene Vinokur

(57) ABSTRACT

Embodiments of the present disclosure provide a wire electric discharge machine (EDM) including a delivery system with one or combination of a wire electrode and a workpiece for delivering the wire electrode and the workpiece into proximity of each other and an energy source for creating electric discharge between the wire electrode and the workpiece. The wire EDM includes a wire electrode position measurement unit including light source to illuminate the wire electrode with encoded illumination pattern and a camera for acquiring a set of images of the wire electrode illuminated by the encoded illumination pattern. The wire EDM includes a processor to reconstruct positions of a segment of the wire electrode at a reconstruction rate greater than an acquisition rate of the camera by utilization of compressive sensing with sparse reconstruction technique and a controller to control the delivery system and the energy source based on the reconstructed positions.

20 Claims, 19 Drawing Sheets

(56) References Cited

U.S. PATENT DOCUMENTS

| | | | |
|---|---|---|---|
| 2019/0061031 A1* | 2/2019 | D'Amario | G06N 20/00 |
| 2020/0033113 A1* | 1/2020 | Slettemoen | G01B 9/02019 |
| 2021/0031287 A1* | 2/2021 | Yamaoka | B23H 1/10 |
| 2023/0182222 A1* | 6/2023 | Mazzolini | B23H 1/022 |
| | | | 219/69.17 |
| 2023/0201939 A1* | 6/2023 | Boccadoro | B23H 7/20 |
| | | | 219/69.17 |
| 2024/0051050 A1* | 2/2024 | Watanabe | B23H 7/10 |

OTHER PUBLICATIONS

Sameh Habib et al, Experimental investigation on wire vibration during fine wire electrical discharge machining process, Sep. 2015, pp. 1-12 (Year: 2015).*

P. Boufounos and M. S. Asif, "Compressive sampling for streaming sig-nals with sparse frequency content," in 2010 44th Annual Conference on Information Sciences and Systems (CISS), 2010, pp. 1-6.

A. Veeraraghavan, D. Reddy, and R. Raskar, "Coded strobing photography: Compressive sensing of high speed periodic videos," IEEE Transactions on Pattern Analysis and Machine Intelligence, vol. 33, No. 4, pp. 671-686, 2011.

J. Chen and X. Huo, "Theoretical results on sparse representations of multiple-measurement vectors," IEEE Transactions on Signal Processing, vol. 54, No. 12, pp. 4634-4643, 2006.

\* cited by examiner

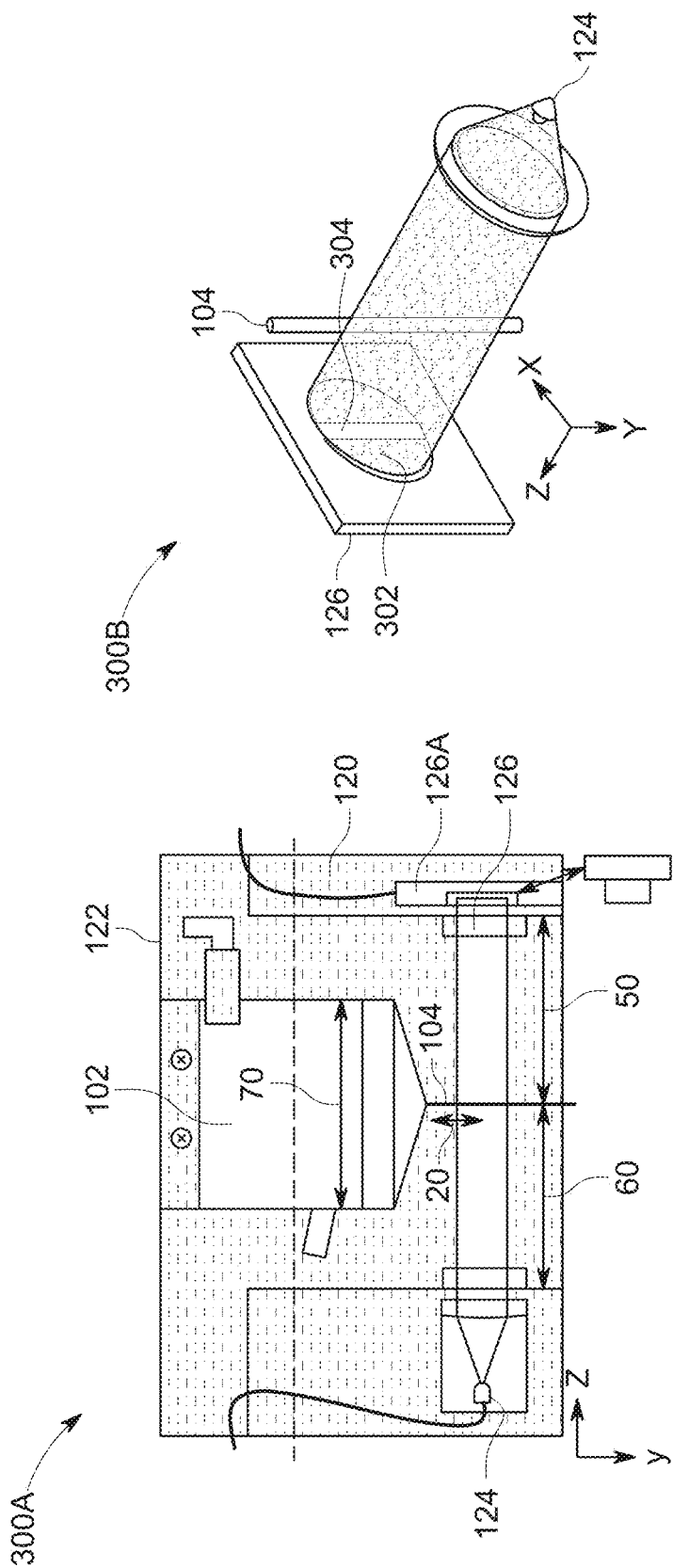

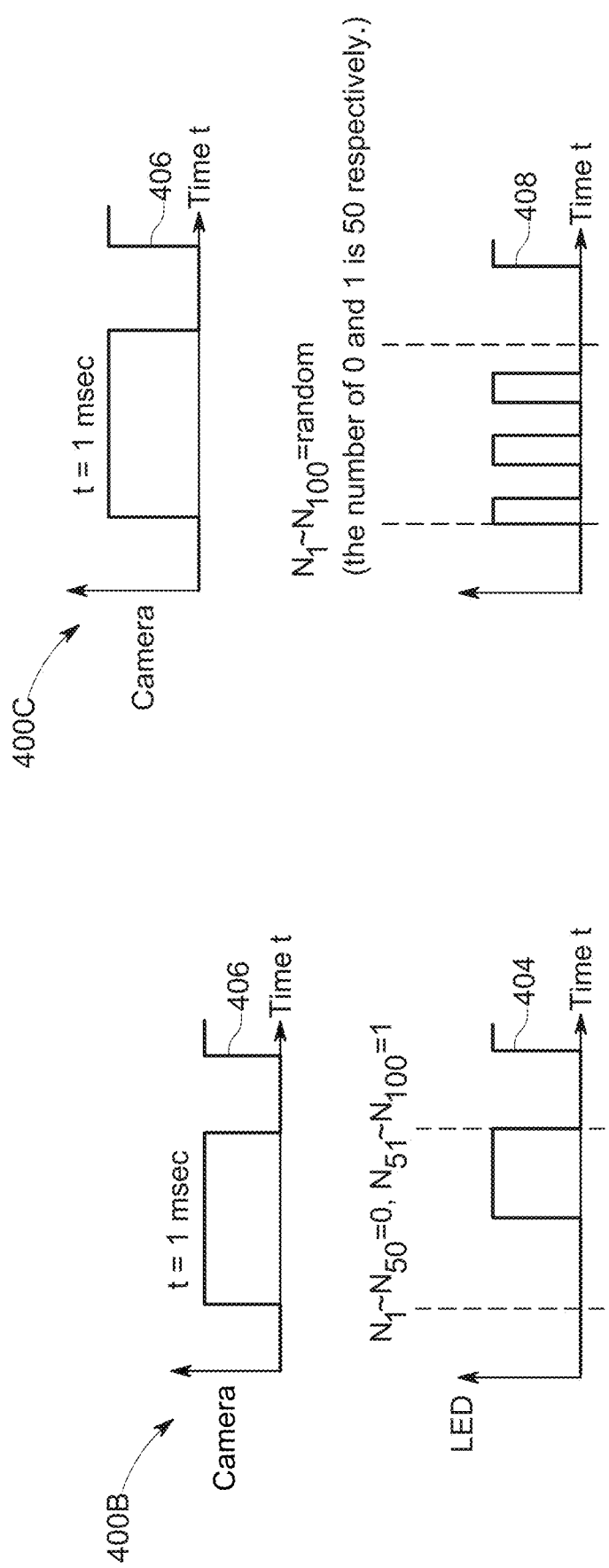

SYSTEM AND METHOD FOR CONTROLLING A WIRE ELECTRIC DISCHARGE MACHINE

TECHNICAL FIELD

The present invention relates generally to a wire electrical discharge machine (EDM), and more particularly to the method of controlling the wire EDM for machining a workpiece.

BACKGROUND

Electrical discharge machining (EDM) is a metal fabrication process in which a desired shape of a metal workpiece is obtained by using electrical discharges (or sparks). Material is removed from the metal workpiece by a series of rapidly recurring current discharges between two electrodes, separated by a dielectric liquid and subject to an electric voltage. One of the electrodes is a tool electrode or a tool, while the other is the workpiece-electrode, or the workpiece. The fabrication process depends upon the tool and the workpiece not making physical contact.

A wire electric discharge machine (wire EDM) is a precision cutting device that utilizes the EDM fabrication process for machining the workpiece. The tool electrode in the wire EDM is a wire and the workpiece acts as the second electrode. When the electric voltage between the wire and the workpiece is increased, an intensity of an electric field in a volume between the wire and the workpiece becomes greater, thereby causing a dielectric breakdown of the dielectric liquid, that leads to production of an electric arc. As a result, the material is removed from the electrodes, i.e., the wire and the workpiece.

Typically, to avoid erosion of the wire causing it to break, the wire is wound between two spools such that an active part of the wire is constantly changing. However, the incidence of electric discharges and a relatively small diameter of the wire cause the wire to vibrate while it is damped on two supports that restrict the length of the wire vibration.

Generally, the wire EDMs are provided with an arrangement for one or two types of machining or cutting, such as rough cutting and skim cutting. The rough cutting involves machining of the workpiece roughly and quickly whereas the skim cutting involves an additional operation where the wire traces back a same path after the rough cut is finished. Therefore, the skim cutting requires more precision to obtain a more refined, accurate cut with surface integrity as compared to the rough cut. Notably, while the rough cutting and the skim cutting have different objectives, the accuracy of both types of cutting depends on the vibration of the wire.

Conventionally, such a vibration estimation with the desired precision is challenging due to disturbances and different forces acting during the wire. Moreover, one or more conventional methods utilize optics to focus a reflection of light to a one-dimensional sensor detecting an oscillation of the wire in one direction as a position change of an image forming point of the one-dimensional sensor. Such an arrangement allows for detecting small vibrations of the wire, however, results of estimating the vibration are inaccurate for controlling the wire EDM for the precise machining processes.

To that end, to address the aforesaid issues, there exists a need for a method for estimation of the vibration of the wire with precision suitable for maintaining the accuracy of the wire EDM during the rough and the skim cutting procedures.

SUMMARY

The present disclosure provides a wire electrical discharge machine (EDM) and a method of controlling the wire EDM for machining a workpiece.

Some embodiments are based on understanding that detecting a position change of an image forming point of a one-dimensional sensor of a camera allows reconstructing a vibration of a wire electrode in a frequency domain. However, for such a reconstruction, some assumptions need to be made. For example, one assumption is that a frequency of the timing of the position change on a line is indicative of the vibration of the entire wire electrode. However, such an assumption may be incorrect in the context of the wired EDMs because electric discharge, as well as the ripples of electrolyte caused by a machining of the workpiece, disturb the wire electrode with multiple unknown frequency harmonics.

Accordingly, controlling machining of the workpiece only based on the vibration feedback determined on a line, may provide insufficient information for the control. The wire electrodes are soft continuums that deform significantly during the machining. The deformation is transferred to the machined surface, such as the workpiece, which causes deterioration of workability. Thus, it is difficult to predict a behavior of the wire electrode because the wire electrode is affected by a physical phenomenon in which various factors, such as explosions due to electric discharge and water pressure due to processing liquid are intricately entwined. Hence, there is a need to estimate a physical behavior of the wire electrode to improve an accuracy of controlling the wire EDMs.

Some embodiments are based on the recognition that the physical behavior of the wire electrode may be represented by positions and/or shape of the wire electrode at different instances of time. Such representation is indicative of both the wire displacement as well as frequencies and amplitudes of the vibration, which is advantageous for the accuracy of control. Hence, it is an object of some embodiments to estimate different positions and/or shape of at least a segment of the wire electrode at different instances of time. Additionally or alternatively, it is an object of some embodiments to estimate frequencies and amplitudes of the vibration of different segments of the wire.

Some embodiments are further based on a recognition that a camera observing the wire electrode with at least a two-dimensional 2D field of view (FoV) may be used to reconstruct the position of the wire electrode at different instances of time. However, such a solution suffers from a number of problems. For example, the vibration frequency of the wire electrodes in the wire EDMs generally ranges approximately 1 Kilohertz (kHz), that would require a camera with at least 2000 frames per second (fps) acquisition rate to accurately localize the wire electrode. Such high-speed cameras may add a significant cost to the equipment of the wire EDMs. In addition, the electric discharge creates a wide white blurb disturbing acquisition of a 2D image. Besides, bubbles or other transient objects may also cast a shadow disturbing acquisition of a 2D image. Hence, it is an object of some embodiments to utilize a compressive sensing with sparse reconstruction technique that enables elimination of usage of the high-speed camera with high fps that may be expensive, thereby reducing the cost of usage of the wire EDM.

To that end, some embodiments are based on the realization of a wire EDM for machining a workpiece. The wire EDM comprises a delivery system, such as a pulley in contact with one or a combination of a wire electrode and the workpiece for delivering the wire electrode and the workpiece into proximity of each other. The wire EDM further comprises an energy source configured to create an electric discharge between the wire electrode and the workpiece. The EDM further comprises a wire electrode position measurement system comprising a light source configured to illuminate the wire electrode with an encoded illumination pattern, and a camera having an image sensor arranged to acquire a set of images indicative of the wire electrode illuminated by the encoded illumination pattern at different positions. The wire EDM further comprises a processor configured to reconstruct positions of at least a segment of the wire electrode at a reconstruction rate greater than an acquisition rate of the camera by utilization of compressive sensing with sparse reconstruction technique. The wire EDM further comprises a controller configured to control at least one of: the delivery system and the energy source based on the positions of at least the segment of the wire electrode reconstructed at the reconstruction rate.

Some embodiments are based on the realization that the energy source is further configured to generate a waveform composed of a sequence of ON time and OFF time voltage pulses. A processing energy is reduced by shortening a duration of the ON time voltage pulses or by extending a duration of the OFF time processing energy is increased by extending the duration of the ON time voltage pulses or by shortening the duration of the OFF time voltage pulses. The processing energy is kept constant, and a voltage feedback control is applied to control a processing speed of the workpiece. The control of the processing speed of the workpiece enables accuracy in machining the workpiece.

Some embodiments are based on the realization that the encoded illumination pattern of the light source is configured to generate a pseudorandom sequence of ON and OFF light pulses. A duration of each pulse of the pseudorandom sequence of ON and OFF light pulses is smaller than or equal to a Nyquist sampling rate of a frequency of vibration of the wire electrode. A total duration of the pseudorandom sequence of the ON and OFF light pulses is less than or equal to a duration of a frame exposure of the camera. The duration of each pulse of the sequence of ON and OFF light pulses to be smaller than or equal to the Nyquist sampling rate of the frequency of vibration of the wire electrode enables reduction in a cost of the camera.

Some embodiments are based on the realization that the light source and the camera of the wire electrode position measurement unit are arranged at opposite sides of the wire electrode. The image sensor of the camera is configured to acquire the set of images of a summation of shadows of the wire electrode encoded by the illumination pattern as the wire electrode moves across the image sensor of the camera. The acquisition of the set of images of the summation of shadows enable determination of a movement or the vibration of the wire electrode.

Some embodiments are based on the realization that the compressive sensing with sparse reconstruction technique comprises buffering the set of images acquired from the camera. The compressive sensing with sparse reconstruction technique further comprises removing shadows of bubbles from a shadow of the wire electrode moving across the image sensor captured in the set of images acquired from the camera, to produce a set of bubble-free images of the wire electrode encoded by the encoded illumination pattern. The production of the bubble-free images enables elimination of contamination of a spectrum of a purely vibrating wire electrode from the set of images. The compressive sensing with sparse reconstruction technique further comprises compressing a pixel dimension of the set of bubble-free images to be equal to a number of images in the set of images by multiplying the pixel dimension by a Gaussian random matrix to output a set of compressed images. The compressive sensing with sparse reconstruction technique further comprises solving a group one-norm sparse recovery problem to compute a spectrum matrix of the wire electrode from the set of compressed images. The wire electrode is accompanied with vibrations while moving across the image sensor. The compressive sensing with sparse reconstruction technique further comprises identifying a reduced set of frequency bins corresponding to locations of rows of the spectrum matrix that comprises the largest Euclidean norms. The compressive sensing with sparse reconstruction technique further comprises solving a least squares reconstruction problem using the reduced set of frequency bins to reconstruct a high temporal resolution set of images of the motion of the wire electrode with a spatial resolution equal to a spatial resolution the image sensor of the camera. The compressive sensing with sparse reconstruction technique further comprises outputting the positions of at least the segment of the wire electrode from the reconstructed high temporal resolution set of images of the motion of the wire electrode. The utilization of the compressive sensing with sparse reconstruction technique enables reconstruction of the high temporal resolution set of images without a need of a camera with high fps which is expensive.

Some embodiments are based on the realization that the removing of the shadows of bubbles from the set of images acquired from the camera to produce the set of bubble-free images is performed by solving a robust principal component analysis problem. The robust principal component analysis problem comprises modeling the set of images as being composed of a low rank matrix component and a sparse matrix component. The low rank matrix component corresponds to the vibrating wire electrode without bubbles and the sparse component corresponds to the bubbles. The robust principal component analysis problem further comprises outputting the low rank matrix component as the set of bubble-free images.

Some embodiments are based on the realization that the solving the group one-norm sparse recovery problem comprises minimizing a difference between the set of compressed images and a synthesized set of compressed images formed by a product of the spectrum matrix of the vibrating wire electrode and a Fourier transform applied in an upsampled temporal domain. The solving the group one-norm sparse recovery problem further comprises regularizing the minimization of the difference by a sum of the Euclidean norms of the rows of the spectrum matrix of the vibrating wire electrode and outputting the spectrum matrix in the upsampled temporal domain that is sparse in the frequency bins by having a small number of nonzero row norms.

Some embodiments are based on the realization that the controller is further configured to determine at least a frequency of vibration of the wire electrode by converting a reduced set of frequency bins to a physical frequency value. The controller is further configured to determine at least an amplitude of vibration of the wire electrode by converting the positions of the segments of the wire electrode on a sensor array to a physical position of the wire electrode according to the geometry of components of a wire electrode position measurement unit. The determined frequency of vibration of the wire electrode and the amplitude of vibration of the wire electrode is utilized for control of the wire EDM for precise machining of the workpiece.

Some embodiments are based on the realization that the controller is further configured to reduce a possibility of breakage of the wire electrode during a rough cut by performing control actions based on analysis of the determined frequency and amplitude of vibration of the wire electrode for noticeable changes, reduction of a processing energy input to the wire electrode, based on a detection of one or more noticeable change, and reduction in a processing speed of the workpiece and the delivery system, based on the detection of the one or more noticeable changes. The reduction of the processing energy input and the reduction in the processing speed of the workpiece and the delivery system enables the safe operation of the wire EDM.

Some embodiments are based on the realization that the controller is further configured to control an amount of straightness and a size error of a cut during a skim cut by performing control actions based on analysis of the amplitude of wire vibration to detect the amplitude to be larger than a threshold, reduction in a processing speed of the workpiece and the delivery system to reduce the amplitude of the vibration in the wire electrode when a shape of the wire electrode is estimated to be a convex shape, increase in a processing speed of the workpiece and the delivery system to increase the amplitude of the vibration in the wire electrode when the shape of the wire electrode is estimated to be a concave shape, and increase in a machining energy when the wire electrode is away from the workpiece and decrease in the machining energy when the wire electrode is closer to the workpiece. Such control enables the enhancement of the accuracy of the skim cut.

Some embodiments are based on the realization that the controller is further configured to control streaks of a cut during a skim cut by performing control actions based on analysis of the amplitude of vibration to detect a fluctuation in the vibration of the wire electrode, reduction in a processing speed of the workpiece and the delivery system to reduce the amplitude of the vibration in the wire electrode when a shape of the wire electrode is estimated to be a convex shape, increase in the processing speed of the workpiece and the delivery system to increase the amplitude of the vibration in the wire electrode when the shape of the wire electrode is estimated to be a concave shape and increase in the machining energy when the wire electrode is away from the workpiece and decrease in the machining energy when the wire electrode is closer to the workpiece. Such control of the streaks of the cut during the skim cut enables enhancement of the precision of the skim cut.

Accordingly, some embodiments, disclose a method for machining a workpiece. The method includes delivering a wire electrode into proximity of a workpiece. The method further includes creating an electric discharge between the wire electrode and the workpiece. The method further includes illuminating the wire electrode with an encoded illumination pattern. The method further includes acquiring a set of images indicative of the wire electrode illuminated by an encoded illumination pattern at different positions. The method further includes reconstructing positions of at least a segment of the wire electrode at a reconstruction rate greater than an acquisition rate of a camera that acquires the set of images, by utilization of compressive sensing with sparse reconstruction technique. The method further includes controlling at least one of: a delivery system that delivers the wire electrode into proximity of the workpiece and an energy source that creates the electric discharge, based on the positions of at least the segment of the wire electrode reconstructed at the reconstruction rate.

Accordingly, some embodiments, disclose a non-transitory computer-readable medium storing computer-executable instructions for machining a workpiece. The computer-executable instructions are configured for delivering a wire electrode into proximity of a workpiece. The computer-executable instructions are further configured for creating an electric discharge between the wire electrode and the workpiece. The computer-executable instructions are further configured for illuminating the wire electrode with an encoded illumination pattern. The computer-executable instructions are further configured for acquiring a set of images indicative of the wire electrode illuminated by an encoded illumination pattern at different positions. The computer-executable instructions are further configured for reconstructing positions of at least a segment of the wire electrode at a reconstruction rate greater than an acquisition rate of a camera that acquires the set of images, by utilization of compressive sensing with sparse reconstruction technique. The computer-executable instructions are further configured for controlling at least one of: a delivery system that delivers the wire electrode into proximity of the workpiece and an energy source that creates the electric discharge, based on the positions of at least the segment of the wire electrode reconstructed at the reconstruction rate.

BRIEF DESCRIPTION OF THE DRAWINGS

The present disclosure is further described in the detailed description which follows, in reference to the noted plurality of drawings by way of non-limiting examples of exemplary embodiments of the present disclosure, in which like reference numerals represent similar parts throughout the several views of the drawings. The drawings shown are not necessarily to scale, with emphasis instead generally being placed upon illustrating the principles of the presently disclosed embodiments.

FIG. 3A illustrates a schematic diagram that depicts an exemplary position of different components of a wire electrode position measurement unit with respect to a wire electrode embedded in a machining fluid, according to some embodiments of the present disclosure.

FIG. 3B illustrates a schematic diagram of an image of set of images acquired by a camera of the wire electrode position measurement unit, according to some embodiments of the present disclosure.

FIG. 4B illustrates a diagram that depicts a constant illumination pattern generated by a light source, according to some embodiments of the present disclosure.

FIG. 4C illustrates a diagram that depicts a pseudorandom sequence of ON and OFF light pulses generated by a light source, according to some embodiments of the present disclosure.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure. Contemplated are various changes that may be made in the function and arrangement of elements without departing from the spirit and scope of the subject matter disclosed as set forth in the appended claims.

As used in this specification and claims, the terms "for example," "for instance," and "such as," and the verbs "comprising," "having," "including," and their other verb forms, when used in conjunction with a listing of one or more components or other items, are each to be construed as open ended, meaning that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

System Overview

Figure 1A:
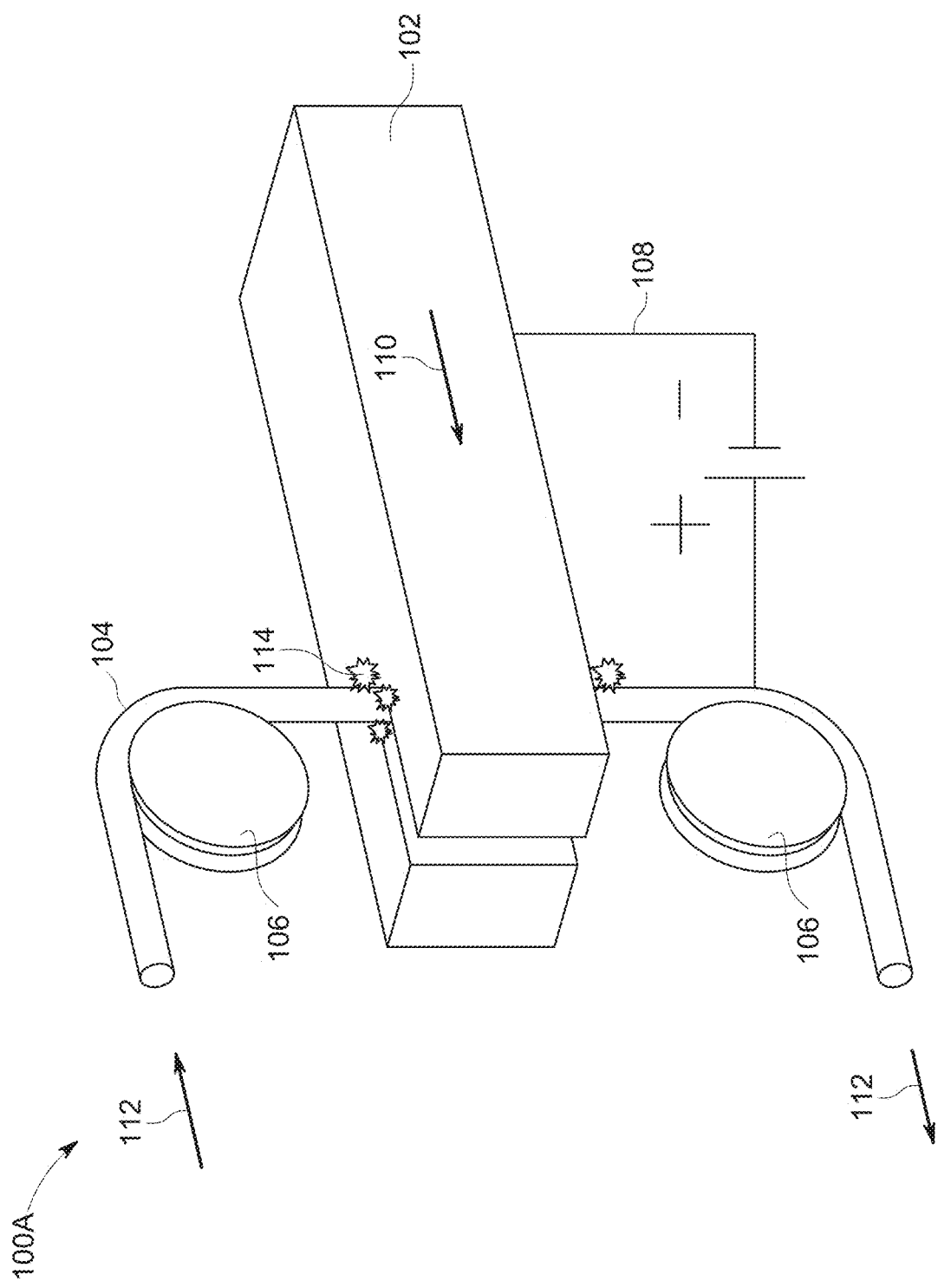
FIG. 1A shows a schematic diagram of basic components of a wire electrical discharge machine (EDM), according to some embodiments of the present disclosure.

FIG. 1A shows a schematic diagram 100A of a part of a wire electrical discharge machine (EDM), according to some embodiments of the present disclosure. The schematic diagram 100A includes a workpiece 102, a wire electrode 104, wire guides 106 and an energy source 108. The schematic diagram 100A further depicts a direction of motion 110 of the workpiece 102 and a direction of motion 112 of the wire electrode 104. In different implementations, the EDM is configured to move one or a combination of the workpiece and the wire electrode itself. Hence, in some embodiments, the machining speed is relative speed between the wire and the workpiece. The schematic diagram 100A further depicts an electric discharge 114.

The workpiece 102 may be a piece of metal that needs to be fabricated in a desired shape. The wire electrode 104 may be a piece of wire that may be utilized for the fabrication of the workpiece 102. The wire EDM utilizes electric discharge 114 or sparks for removal of material from the workpiece 102 to obtain the desired shape of the workpiece 102. The wire electrode 104 acts as a first electrode and the workpiece 102 acts as a second electrode. The wire electrode 104 and the workpiece 102 are separated by a dielectric liquid, and a series of rapidly recurring current discharges or the electric discharge 114 are produced between the two electrodes, such as the wire electrode 104 and the workpiece 102 by application of an electric voltage from the energy source 108, to remove the material from the workpiece 102.

The energy source 108, such as a voltage source is used to provide the electric voltage between the two electrodes. The workpiece 102 moves in the direction of motion 110 during the machining of the workpiece 102, and a speed of movement of the workpiece 102 is a processing speed. The wire electrode 104 moves in the direction of motion 112 for machining of the workpiece 102, and a speed of movement of the wire electrode 104 is feed rate of the wire electrode 104. The movement of the wire electrode 104 may be controlled via the wire guides 106. Moreover, an incidence of the electric discharge 114 and a relatively small diameter of the wire electrode 104 causes the wire electrode 104 to vibrate while it is damped on two supports that restrict the length of the wire vibration. Details of the wire EDM of the present disclosure and the components associated therewith are further provided, for example, in FIG. 1B.

Figure 1B:
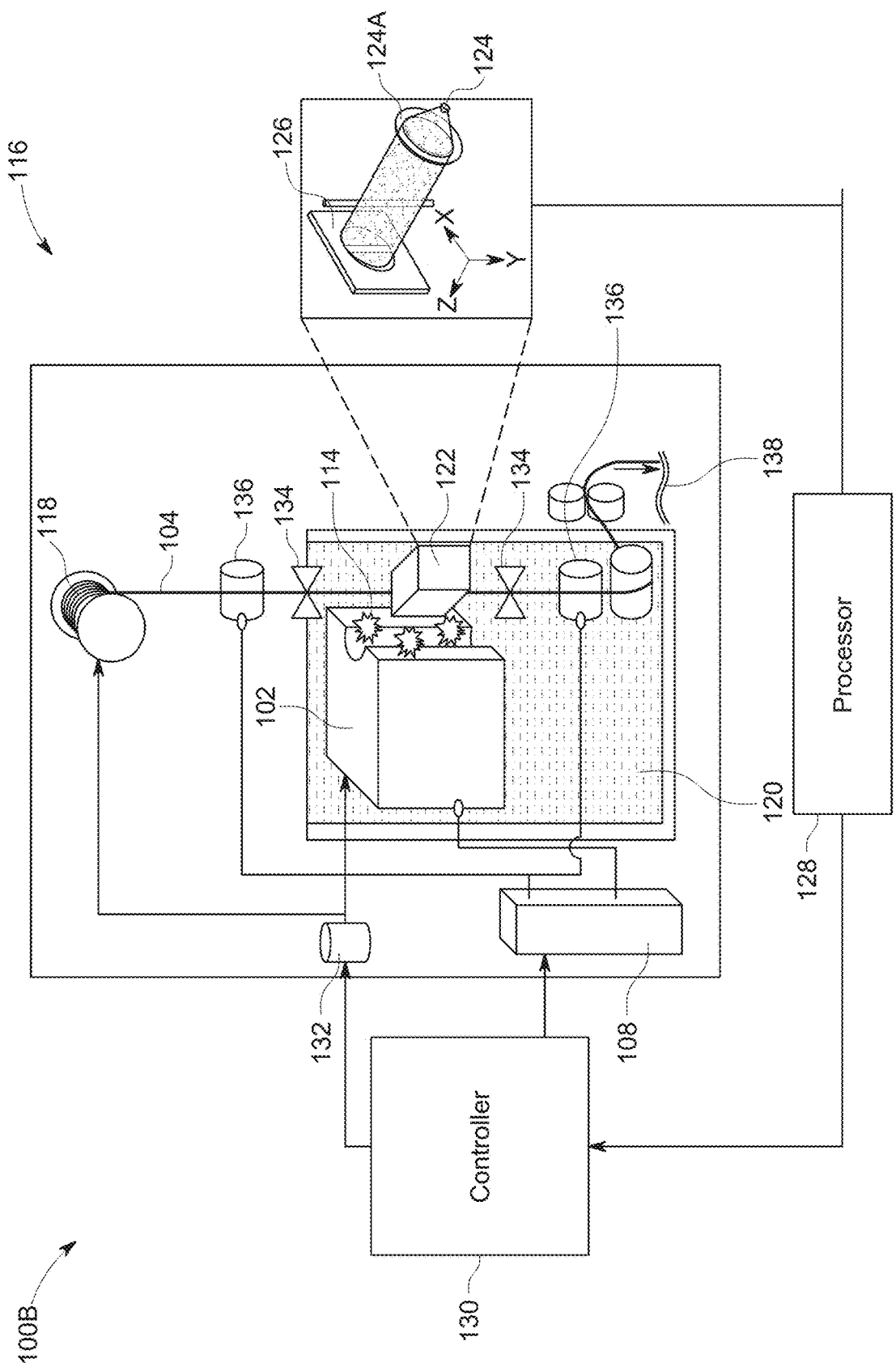
FIG. 1B shows a schematic diagram of the wire EDM for machining a workpiece, according to some embodiments of the present disclosure.

FIG. 1B shows a schematic block diagram 100B of a wire EDM 116 for machining the workpiece 102, according to some embodiments of the present disclosure. The wire EDM 116 may include the wire electrode 104, the energy source 108, a delivery system 118, a machining fluid 120, and a wire electrode position measurement system 122. In some implementations, the delivery system 118 is a wire bobbin configured to control the wire feed. Additionally or alternatively, in some embodiments, the wire feed rate is controlled from the wire bobbin but also the position of the wire itself is controlled by workpiece motor 132. The wire electrode position measurement system 122 further includes a light source 124 and a camera 126 having an image sensor, such as a line sensor, and/or a two-dimensional (2D) sensor. The line sensor can reconstruct the vibration of a point of the wire. In some implementations, the image sensor is 2D to reconstruct a section of the wire including multiple points. This implementation provides more accurate results. The wire EDM 116 may further include a processor 128 and a controller 130. In an embodiment, the processor 128 and a controller 130 may a part of a control unit. The wire EDM 116 may further include a workpiece motor 132, a set of electrode supports 134, a set of power supply pieces 136 and a waste box 138.

The delivery system 118 may comprise a pulley, also referred as a wire bobbin and the delivery system 118 is in contact with one or a combination of the wire electrode 104 and the workpiece 102 for delivering the wire electrode 104 and the workpiece 102 into proximity of each other. The delivery system 118 is configured to deliver the wire electrode 104 into proximity of the workpiece 102. The delivery system 118 may comprise a roll of the wire electrode 104, such that a part of the wire electrode 104 from the roll gets delivered in the proximity of the workpiece 102 as needed. The wire electrode 104 and the workpiece 102 may be embedded in the machining fluid 120. In an embodiment, the machining fluid 120 may be composed of either water or oil.

The energy source 108 is configured to create the electric discharge 114 between the wire electrode 104 and the workpiece 102. When the electric voltage between the two electrodes (that is, the wire electrode 104 and the workpiece 102) is increased, an intensity of an electric field in a volume between the electrodes becomes greater, causing a dielectric breakdown of the dielectric liquid (such as the machining fluid 120), and producing an electric arc or the electric discharge 114. As a result, the material is removed from the electrodes. Once current stops, a new liquid dielectric is conveyed into an inter-electrode volume, enabling solid particles (or debris) to be carried away and insulating properties of the dielectric liquid to be restored. Further, new liquid dielectric is added in the inter-electrode volume, referred as flushing. After a current flow, the electric voltage between the electrodes is restored as before the dielectric breakdown such that the new liquid dielectric breakdown may occur to repeat the cycle.

The wire electrode position measurement system 122 includes the light source 124 configured to illuminate the wire electrode 104 with an encoded illumination pattern. In an embodiment, the light source 124 is a light emitting diode (LED). In one or more embodiments, the wire electrode position measurement system 122 may further include a lens 124A arranged in a line-of-sight of the light source 124 to converge the light from the light source 124 towards the wire electrode 104. The wire electrode position measurement system 122 further includes the camera 126 having the image sensor. The camera 126 may be arranged to acquire a set of images indicative of the wire electrode 104 being illuminated by the encoded illumination pattern at different positions. For example, the camera 126 may be placed opposite to a direction of the light source 124, such that a segment of the wire electrode 104 lies between the light source 124 and the image sensor of the camera 126, to capture the set of images. In an embodiment, the electric discharge 114 may cause a white blurb. The encoded illumination pattern may be generated inconsistent with the white blurb to reduce an effect of the white blurb in the acquired set of images.

The processor 128 is configured to reconstruct positions of at least the segment of the wire electrode 104 at a reconstruction rate greater than an acquisition rate of the camera 126 by utilization of compressive sensing with sparse reconstruction technique. The reconstruction rate may be defined as a speed at which the positions of the at least the segment of the wire electrode 104 are reconstructed by the processor 128. Moreover, the acquisition rate may be defined as a speed at which the camera 126 acquires the set of images. The compressive sensing with sparse reconstruction technique processes the acquired set of images with a computational technique that may enable a temporal upsampling of the positions of the wire electrode 104 to identify an exact position of the wire electrode 104 at a temporal sampling rate (or the reconstruction rate) that matches or exceeds a Nyquist rate. The Nyquist rate may be associated with a sampling rate that may be equal to or twice a bandwidth of the acquired frames (such as the set of images) by the camera 126. In such a manner, the set of images may be acquired at a low rate, i.e., the rate lower than the Nyquist rate. Such an acquisition of the set of images at the low rate may enable reduction in a cost of the camera 126, as a requirement of a high frame rate camera that may be expensive is eliminated. Furthermore, the compressive sensing with sparse reconstruction models a video of the vibrating wire electrode 104 as a frequency sparse signal and the controller 130 may be configured to formulate a joint-sparsity recovery problem to determine a frequency of vibration of the wire electrode 104 as well as reconstruct the high frame rate video. Such a solution may address disturbances caused by bubbles and/or ripples in the machining liquid 120 having frequencies inconsistent with the sparsity of vibrations of the wire electrode 104. Details of the compressive sensing with sparse reconstruction are further provided for example, in FIG. 10.

Returning to FIG. 1B, the controller 130 is configured to control at least one of the delivery system 118 and the energy source 108 based on the positions of at least the segment of the wire electrode 104 reconstructed at the reconstruction rate. The controller 130 may determine the processing speed of the workpiece 102 and the amount of electric potential (or the electric voltage) that may be applied during processing to ensure a clean or a smooth cut of the workpiece 102. The controller 130 may receive information about the position of the wire electrode 104 from the wire position measurement system 122. However, due to certain inaccuracies in overall working of the wire EDM 116, the quality of cuts of the workpiece 102 may suffer.

Figure 2:
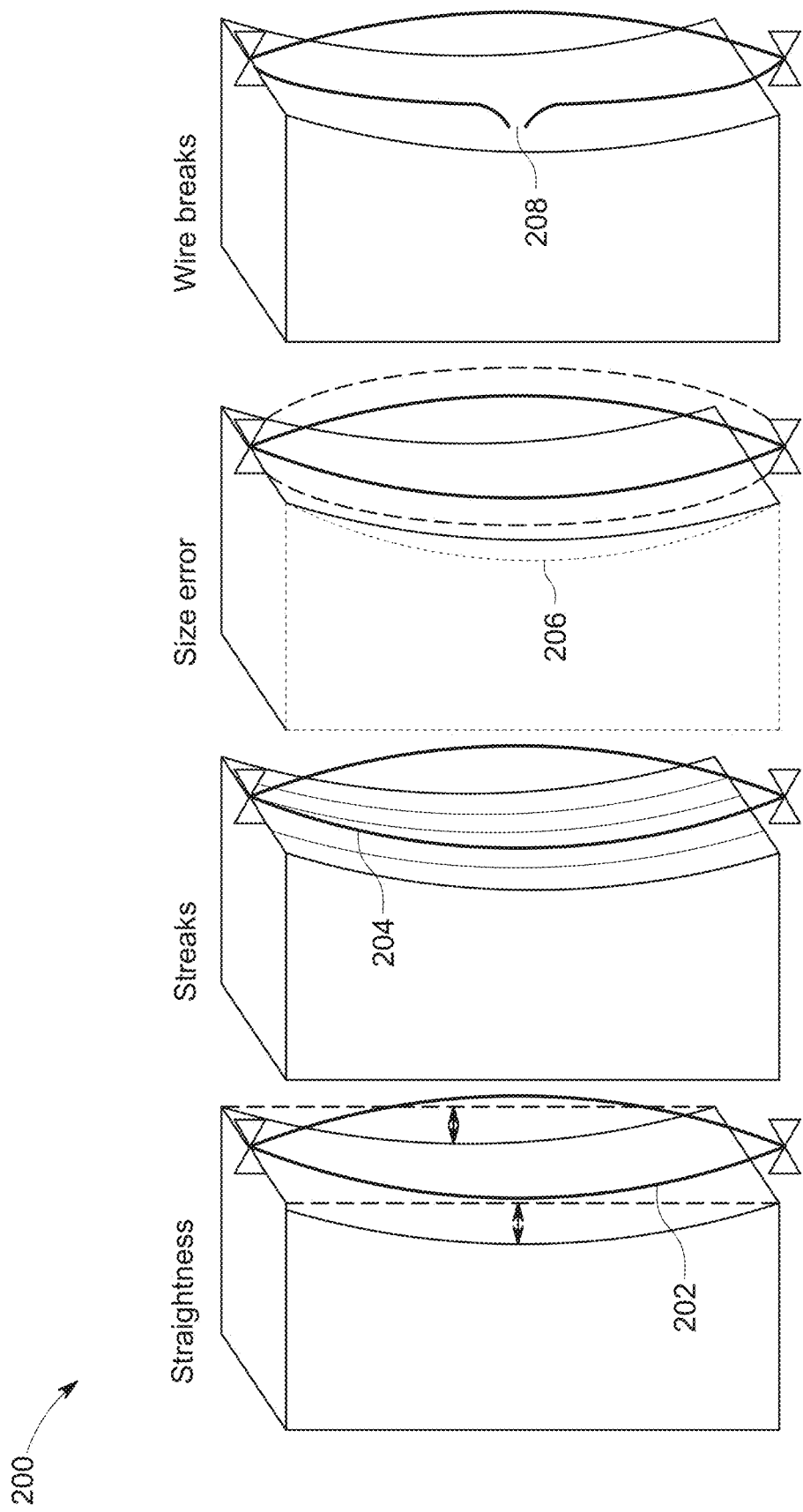
FIG. 2 illustrates inaccuracies that affects a quality of a cut of the workpiece in a conventional wire EDM, according to some embodiments of the present disclosure.

FIG. 2 shows inaccuracies that affect a quality of a cut of the workpiece 102 in the wire EDM 116. The wire EDM 116 may be configured to perform two types of cutting techniques, a rough cut technique and a skim cut technique. The rough cut technique may involve machining of the workpiece 102 roughly. The skim cut technique may include an additional operation where the wire electrode 104 may trace back a same path after the rough cut is finished. Therefore, the skim cutting requires more precision to obtain a more refined, accurate cut with surface integrity as compared to the rough cut.

However, the quality of the cut of the workpiece 102 may be affected by various factors, such as large number of vibrations in the wire electrode 104 of the wire EDM 112. For example, a straightness 202 in the cut in the workpiece 102 may be affected, thereby causing the cut to be inconsistent. Further, due to the vibrations in the wire electrode 104, streaks 204 may be formed in the workpiece 102. Furthermore, a finished size of the workpiece 102 may be undesired due to a size error 206 in the wire electrode 104, due to the vibrations. Moreover, a wire breakage 208 may be observed in the wire electrode 104 due to wear and tear of the wire electrode 104 due to the vibrations. The wire EDM 116 of the present disclosure of overcomes the listed inaccuracies by minimization of the vibrations caused in the wire electrode 104 by use of the wire position measurement system 122. Details of the wire EDM 116 that is able to control the vibrations of the wire electrode 104 are further provided, for example, from FIG. 3 to FIG. 18.

FIG. 3A illustrates a schematic diagram 300A that depicts an exemplary position of different components of the wire electrode position measurement system 122 with respect to the wire electrode 104 embedded in the machining fluid 120, according to some embodiments of the present disclosure. The light source 124 and the camera 126 of the wire electrode position measurement system 122 are arranged at opposite sides of the wire electrode 104. A image sensor 126A of the camera 126 is configured to acquire the set of images of a summation of shadows of the wire electrode 104 encoded by the illumination pattern as the wire electrode 104 moves across the image sensor 126A of the camera 126. The illumination from the light source 124 may be converged by use of the lens 124A arranged in the field-of-view of the light source 124. The light source 124 may be such arranged that the section of the wire electrode 104 cuts the illumination. The positions at which the section of the wire electrode 104 cuts the illumination, may be acquired as the summation of shadows of the wire electrode 104 encoded by the illumination pattern.

FIG. 3B shows a schematic diagram 300B of an image 302 of the set of images acquired by the camera 126 of the wire electrode position measurement system 122, according to some embodiments of the present disclosure. The camera 126 records a shadow 304 of the wire electrode 104 on a sensor plane (such as a Y-axis as depicted). The shadow 304 may be formed by the illumination pattern incident on the wire electrode 104. Similarly, the summation of the shadows, such as the shadow 304 are acquired in corresponding to the set of images, such as the image 302.

Figure 4A:
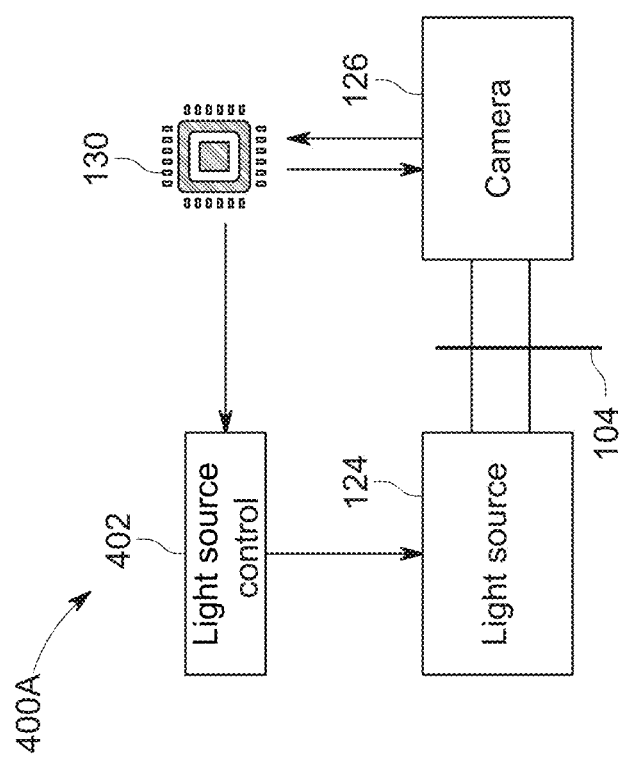
FIG. 4A illustrates a block diagram for control of a camera for determination of timing of trigger and control of a light source for generation of an illumination pattern, according to some embodiments of the present disclosure.

FIG. 4A illustrates a block diagram 400A for control of the camera 126 for determination of timing of trigger and control of the light source 124 for generation of the encoded illumination pattern, according to some embodiments of the present disclosure. The controller 130 may be connected to the light source 124. In an embodiment, the controller 130 may be connected to the light source 124 via an LED control unit 402. The controller 130 may be configured to trigger the encoded illumination pattern of the light source 124. The controller 130 may communicate with the LED control unit 402 to trigger the encoded illumination pattern of the light source 124.

The controller 130 may be connected to the camera 126. The controller 130 may determine a timing of trigger of the camera 126. The timing of trigger of the camera 126 may initiate an exposure of the camera 126 as well as the triggering of the illumination pattern of the light source 124 to coincide with the duration of the exposure of the camera 126. The LED control unit 402 may be programmed to generate a constant encoded illumination pattern or a pseudorandom sequence of ON and OFF light pulses.

FIG. 4B illustrates a diagram 400B that depicts a constant encoded illumination pattern 404 generated by the light source 124, according to some embodiments of the present disclosure. The constant encoded illumination pattern 404 may be generated in the duration when the camera 126 is triggered, i.e., during the exposure time of the camera 126. For example, the constant illumination pattern 404 may include an OFF light pulse for a duration of 0 to 0.5 msec, and an ON light pulse for a duration of 0.5 to 1 msec.

Further, the diagram 400B illustrates a graph 406 depicting an exposure time of the camera 126. In an embodiment, the exposure time may be 1 millisecond (1 msec). The light source 124 may be triggered based on the trigger of the camera 126.

FIG. 4C illustrates a diagram that depicts a pseudorandom sequence of ON and OFF light pulses 408 generated by the light source 124, according to some embodiments of the present disclosure. In some embodiments, the encoded illumination pattern of the light source 124 is configured to generate the pseudorandom sequence of ON and OFF light pulses 408.

The diagram 400C includes the graph 406 depicting the exposure time of the camera 126. The pseudorandom sequence of ON and OFF light pulses 408 may be generated in the duration when the camera 126 is triggered, i.e., during the exposure time of the camera 126. A duration of each pulse of the sequence of ON and OFF light pulses is smaller than or equal to a Nyquist sampling rate of a frequency of vibration of the wire electrode 104. In an example, the duration of each OFF light pulses may be 0.1 msec and a duration of each ON light pulses may be 0.1 msec. Further, a total duration of the pseudorandom sequence of the ON and OFF light pulses 408 is less than or equal to a duration of a frame exposure or the exposure time of the camera 126. The frame exposure or the exposure time of the camera 126 may be for example, 1 msec. The total duration of the pseudorandom sequence of the ON and OFF light pulses 408 may be less than 1 msec.

Figure 5:
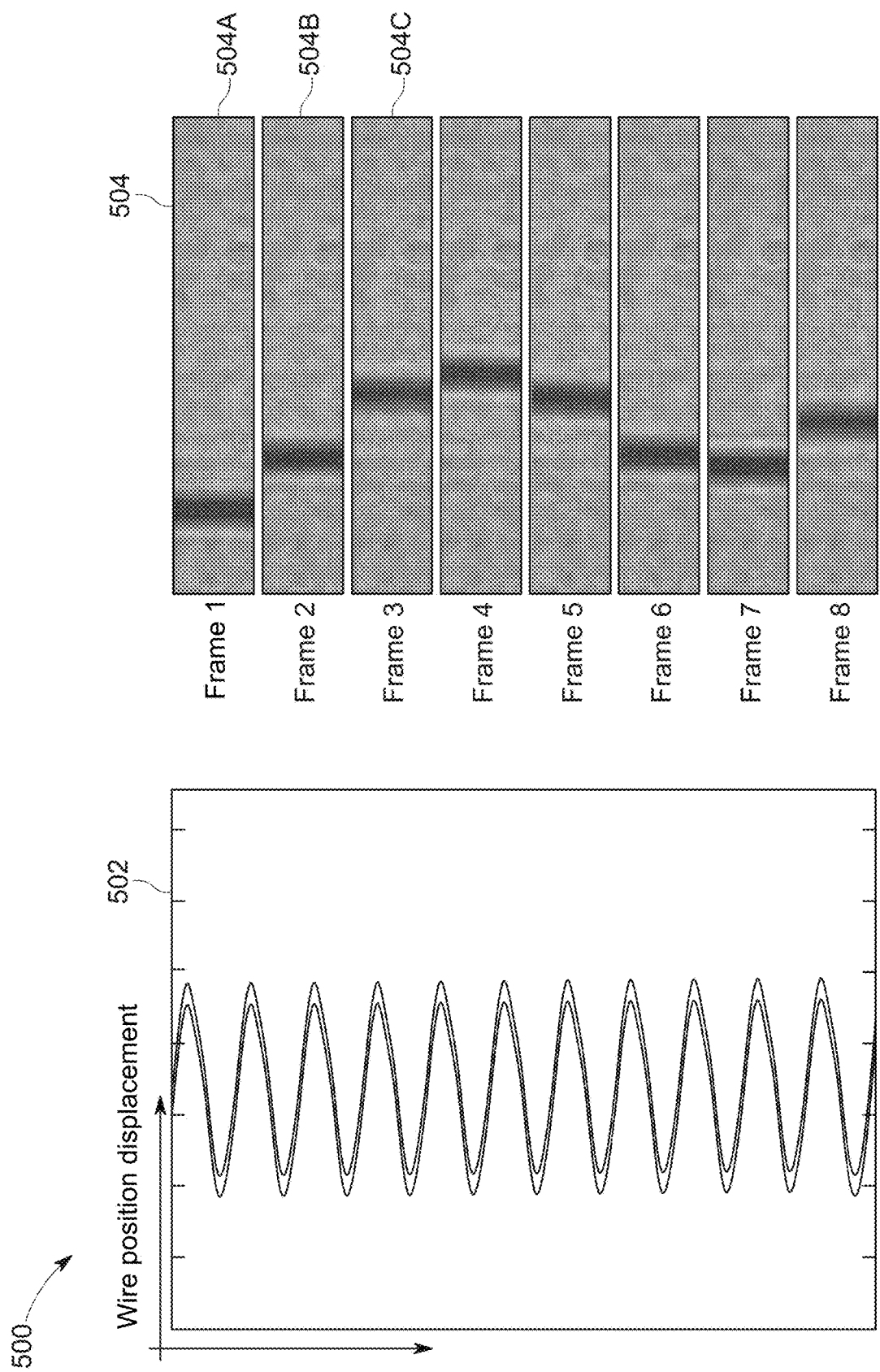
FIG. 5 illustrates a pictorial representation of position of a section of the wire electrode as it changes over time and corresponding sensor measurements observed with the camera, according to some embodiments of the present disclosure.
Figure 6:
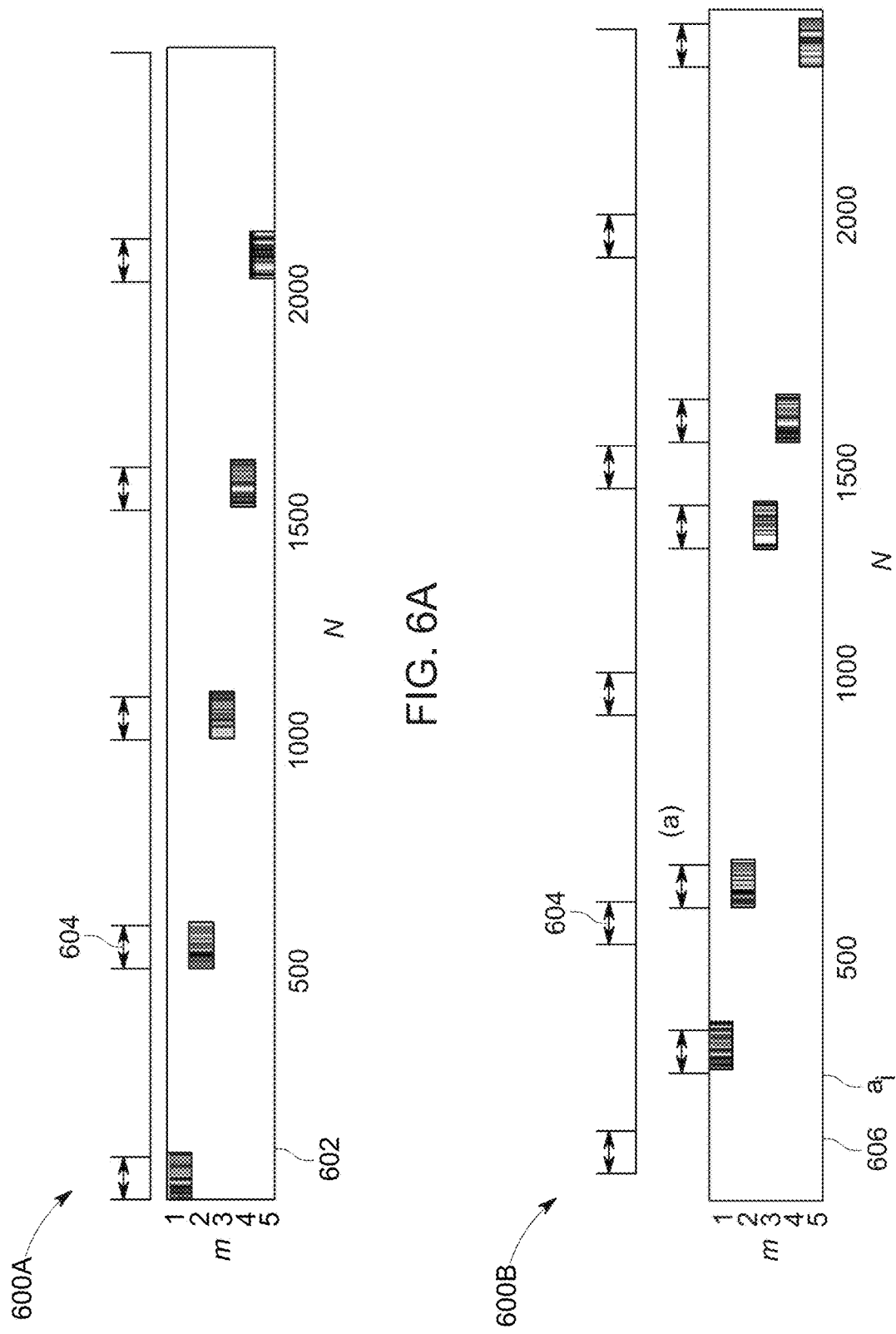
FIG. 6A illustrates a diagram that depicts a measurement operator "A" corresponding to an illumination pattern with a pseudorandom sequence of ON and OFF light pulses that starts at a same instant as a start of an exposure of the camera, according to some embodiments of the present disclosure.
FIG. 6B illustrates a diagram that depicts a measurement operator "A" corresponding to an illumination pattern with a pseudorandom sequence of ON and OFF light pulses that starts at a random instance within a duration of the exposure of the camera, according to some embodiments of the present disclosure.

FIG. 5 shows an illustration 500 of a position 502 of a section of the wire electrode 104 as it changes over time and corresponding sensor measurements 504 observed with the camera 126, according to some embodiments of the present disclosure. The position 502 of the section of the wire electrode 104 changes over time due to the vibrations in the wire electrode 104. The sensor measurements 504 observed may depict multiple frames or the set of images acquired by the camera 126. The set of images depict shadows of the section of the wire electrode 104 as it moves in the field-of-view of the image sensor of the camera 126. For example, a first image 504A depicts the position of the section of the wire electrode 104 at a first instant of time, a second image 504B depicts the position of the section of the wire electrode 104 at a second instant of time, a third image 504C depicts the position of the section of the wire electrode 104 at a third instant of time, and so forth. Examples of generated illumination patterns based on the sensor measurements 504 observed with the camera 126 are further described, for example, in FIG. 6A and FIG. 6B.

FIG. 6A shows a diagram 600A that depicts a measurement operator "A" corresponding to an illumination pattern with the pseudorandom sequence of ON and OFF light pulses that starts at a same instant as a start of an exposure of the camera 126, according to some embodiments of the present disclosure. An example of the measurement operator "A" is shown as a measurement operator 602 in FIG. 6A. An x-axis of the measurement operator 602 is represented by "m". Let m be a number of video frames or the set of images captured by the camera 126 in one second, with corresponding duration of each frame $$t_f := \frac{1}{m}.$$

A y-axis of the measurement operator 602 is represented by "N". It may be assumed that the duration of each frame $t_f$=cs, c∈ $\mathbb{N}$, is an integer multiple of the segment of the time duration $t_s$. Consequently, a target super resolved video may have N=cnm temporal samples for every m video frames captured by the camera 126.

The diagram 600A further includes a duration of exposure 604 of the camera 126. The measurement operator 602 represents a sampling process performed by the combination of the illumination pattern of the light source 124 and the duration of exposure 604 of the image sensor of the camera 126. A number of rows of the measurement operator A 602 may indicate a number of the acquired set of images. The illumination pattern with the pseudorandom sequence of ON and OFF light pulses is generated at the same instants of time as that of the duration of exposure 604 of the camera 126.

FIG. 6B shows a diagram 600B that depicts the measurement operator "A" that corresponds to an illumination pattern with a pseudorandom sequence of ON and OFF light pulses that starts at a random instance within the duration of the exposure 604 of the camera 126, according to some embodiments of the present disclosure. An example of the measurement operator "A" is shown as a measurement operator 606 in FIG. 6B. The measurement operator 606 represents the sampling process performed by the combination of the illumination pattern of the light source 124 and the duration of exposure 604 of the image sensor of the camera 126. The number of rows of the measurement operator 606 may indicate the number of the acquired set of images. The illumination pattern with the pseudorandom sequence of ON and OFF light pulses starts at a random instance within the duration of exposure 604 of the camera 126.

The generation of such illumination patterns, such as the illumination pattern in FIG. 6A and the illumination pattern in FIG. 6B are required for the determination of the vibrations in the wire electrode 104. A knowledge of an exact position and shape of the wire electrode 104 or the cutting wire is important for determining the vibrations or the tension in the wire electrode 104 and the quality of the cut. Typically, a frequency of vibration of the wire electrode 104 ranges around 1 Kilohertz (KHz), that would require a camera with at least 2000 fps acquisition rate to exactly localize the wire electrode 104. Since such high-speed cameras would add a significant cost to the equipment, thus, the wire EDM 116 utilizes the camera 126 with a standard frame rate along with time-coded illumination or aperture, and computation to recover the vibrating frequency and exact position of the wire electrode 104.

The position of the vibrating wire electrode 104 may be estimated as a temporal super resolution problem from the low frame rate video or the set of images acquired by the camera 126. A coded illumination pattern $a_i \in \{0,1\}^n$, for i∈{1 . . . m}, may be employed occupying a time segment of duration s<$t_f$ seconds.

The duration of the encoded illumination pattern may correspond to an exposure or acquisition interval of the low-rate camera. Such as the camera 126, over which the coded illumination pattern may be active. Typically, the exposure or the acquisition interval may be significantly lower than the duration of each frame $t_f$ in practice, as the camera 126 may require some time to transmit data as reset.

Further, the illumination pattern $a_i$ is active during acquisition interval, strobing at uniform rate according to the code, i.e., each coefficient of the illumination pattern is active for a time interval $$t_s = \frac{s}{n}.$$

The time interval $t_s$ may further correspond to a target temporal resolution time step of a super resolved video. It may be assumed that the acquired video or the set of images may be approximately constant over the time interval. The duration of each frame $t_f$=cs, c∈ $\mathbb{N}$, is an integer multiple of the segment of the time duration $t_s$. Consequently, the target super resolved video may have N=cnm temporal samples for every m video frames captured by the camera 126, therefore, i.e., a super resolution rate of cn×temporal upsampling may be obtained.

An acquired set of images or a video sequence with spatial resolution H×W pixels capturing the vibrating wire electrode 104 may be considered over a one second duration. Let Y∈ $\mathbb{R}^{m \times HW}$ denote the measured video frames from one second of video stacked into m rows, each consisting of the H×W pixels vectorized into a single row. A temporally super resolved video volume U∈ $\mathbb{R}^{N \times HW}$, where N=cnm, and the parameters c and n are required to be recovered.

It may be noted that every video frame indexed by i, or ith row of Y, may be captured through the encoded illumination pattern $a_i$ during the duration of the frame exposure period. The measurement operator A∈ $\mathbb{R}^{m \times N}$ may be formed that may relate the target high frame rate video U to the measured video frames Y using a following linear system:

$$Y=AU \quad (1)$$

FIGS. 6A and 6B show two examples of the measurement operator A corresponding to the acquisition of five number of the video frames or the set of images, where m=5, c=5, and n=100. In FIG. 6A, the white lines in the illumination patterns may indicate instances when the strobing illumination is ON. In such an example, every frame may be observed through a different pseudorandom illumination pattern. In FIG. 6B, the illumination pattern $a_i$ are shown as the white lines. In such an example, every frame exposure of the camera 126 is divided into five segments, where a first segment comprises the illumination pattern. The remaining four segments may correspond to the dead-time of the camera exposure. Moreover, an effect of the measurement operator A on a sequence of the vibrating wire electrodes 104 may be perceived through FIG. 7 and FIG. 8.

Figure 7:
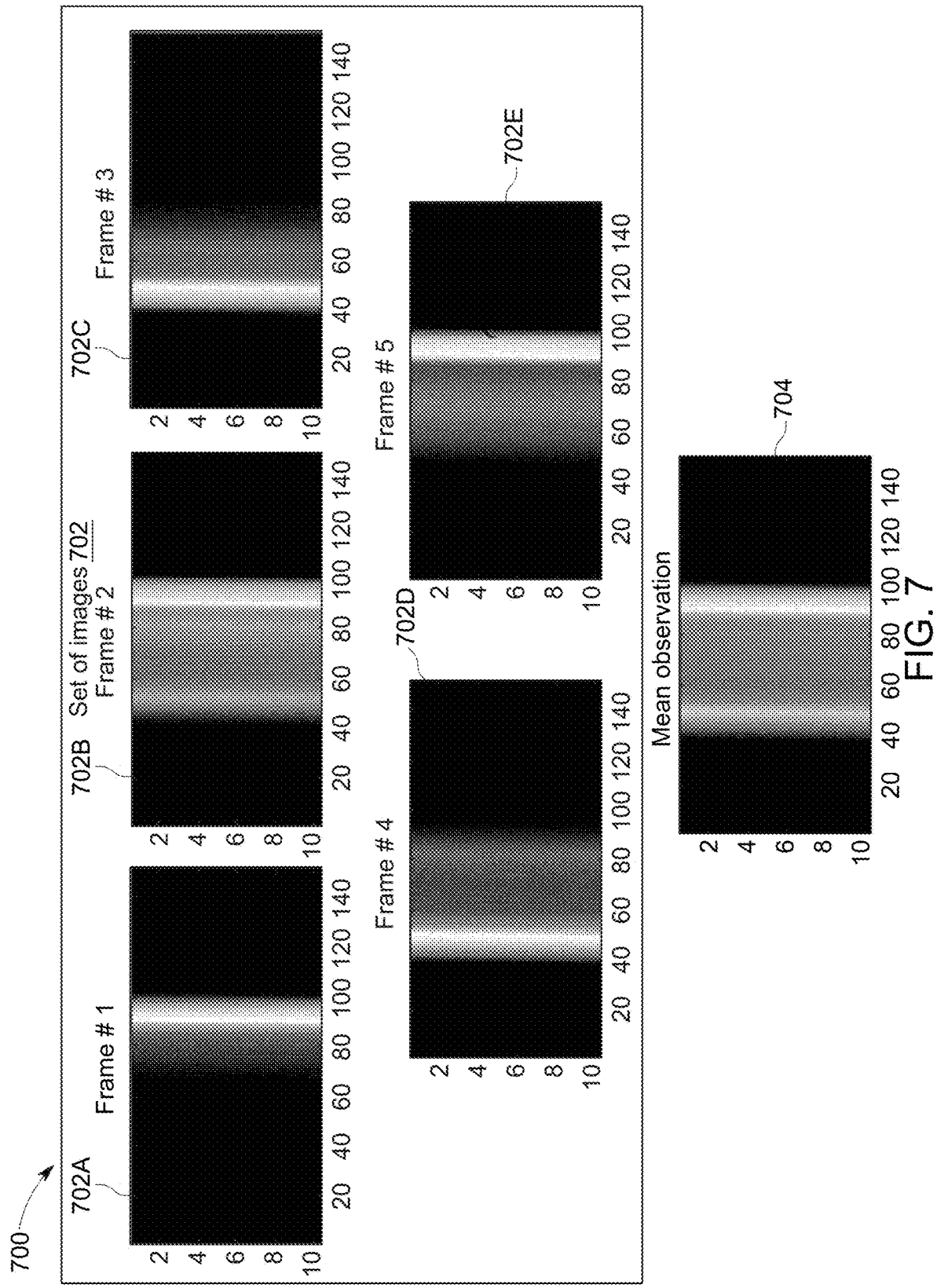
FIG. 7 illustrates a diagram depicting a set of images of a moving wire electrode acquired by the camera, according to some embodiments of the present disclosure.

FIG. 7 illustrates a diagram 700 depicting a set of images 702 of the moving wire electrode 104 acquired by the camera 126, according to some embodiments of the present disclosure. For example, the set of images 702 or frames of the video of the moving wire electrode 104 are acquired using the measurement operator A depicted in FIG. 6A. The set of images 702 depicts a blurb formed by each image of the wire electrode 104 as the wire electrode 104 moves spatially while being illuminated using the time-coded illumination patterns. The set of images 702 may include a first image 702A, a second image 702B, a third image 702C, a fourth image 702D and a fifth image 702E. In an embodiment, the set of images 702 may be same as the sensor measurements 504 of the camera 126.

The set of images 702, such as the first image 702A, the second image 702B, the third image 702C, the fourth image 702D and the fifth image 702E are acquired from the vibrating wire electrode 104 where the measurements correspond to m=5, c=5, and n=100. Every frame or an image of the set of images 702 may be composed of 10×151 pixels. The set of images 702 illustrates a blurring effect resulting from observing the true vibrating wire electrode 104 through the measurement operator A. The diagram 700 further includes a graph 704 depicting mean of the five observed frames, such as the set of images 702.

Figure 8:
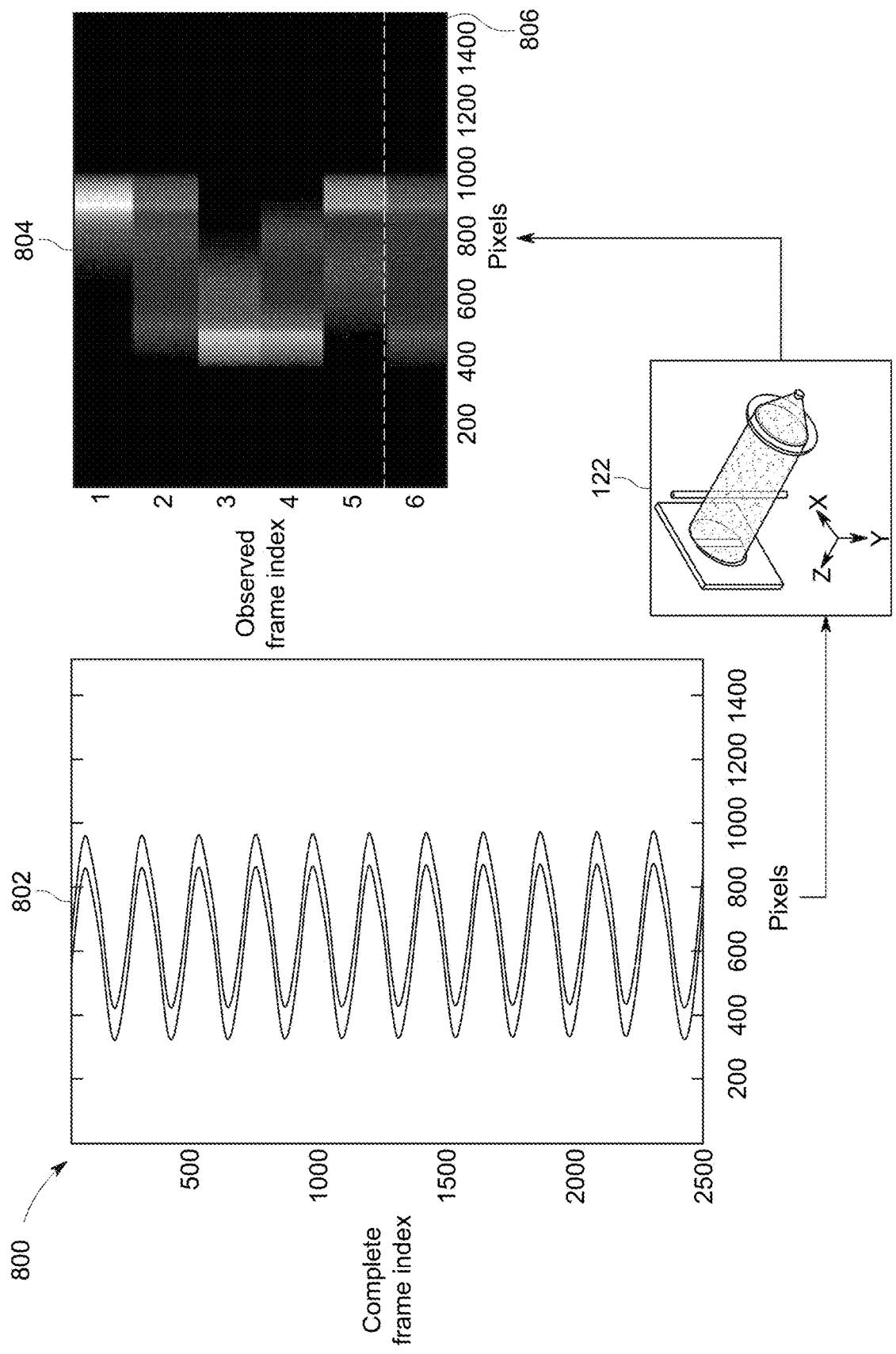
FIG. 8 illustrates a diagram depicting a contrast between a continuous motion of the wire electrode and a sequence of the set of images acquired by the camera, according to some embodiments of the present disclosure.

FIG. 8 illustrates a diagram 800 depicting a contrast between a continuous motion of the wire electrode 104 and a sequence of the set of images 702 acquired by the camera, according to some embodiments of the present disclosure. The diagram 800 includes a vibrating sequence U 802 (acquired as the high frame rate video) of the wire electrode 104 compared to a measured sequence Y 804 observed through the measurement operator A. A last row 806 of the measured sequence Y 804 may correspond to the mean of the five observed frames depicted by the graph 704. A set of five video frames captured through the operator A of an example vibrating sequence U is shown. The measurement operator A results in blurring artifacts in cases where the wire electrode 104 is moving. The mean of the observed video frames may be appended to the measurements as part of the measurement operator A to help speed up the reconstruction of a direct current (DC) component of the acquired vibrating video.

As seen in equation (1), the measurement operator A may act on every pixel of the video, such as the vibrating sequence U in a same manner. It may be noted that, problem in equation (1) may be severely ill-posed as infinitely many solutions of the vibrating sequence U to the system may be possible. However, since the wire electrode 104 is moving or oscillating within a narrow frequency band, an exact reconstruction of a true matrix of the vibrating sequence U may be obtained by exploiting a sparsity in the frequency domain.

Let $F \in \mathbb{C}^{N \times N}$ be an N-dimensional inverse Fourier transform operator, and denote by $X \in \mathbb{C}^{N \times HW}$ the frequency coefficient matrix of the vibrating sequence U, such that U=FX.

Since, intensity fluctuations in the acquired set of images or the video is driven by the vibrations in the wire electrode 104, locations of significant nonzero coefficients in columns of the matrix X may fall within the same frequency bins. Consequently, a jointly sparse structure may be utilized in the matrix X that may allows leveraging of multiple measurement vectors, such as the columns of the measured sequence Y, given by different pixels in the observed video to recover the support of the row-norms of the matrix X.

In an embodiment, a technique for employing the joint-sparsity prior on the matrix X is to utilize an $\ell_{2,1}$-norm penalty function and solve the following optimization problem:

$$\min_X \frac{1}{2}\|Y - AFX\|_F^2 + \lambda\|X\|_{2,1}, \qquad (2)$$

where $\|X\|_{2,1} = \sum_{r=1}^{N}\|X(r:)\|_2$ and X(r:) denotes the rth row of the matrix X.

In context of the sparse signal recovery, a k-sparse vector of length N requires at least 2k+1 measurements to guarantee recovery. However, when multiple measurements are available, the necessary number of measurements may be reduced to 2k+1−rank(Y). Specifically, if a measurement matrix $Y \in \mathbb{R}^{m,M}$ is not rank deficient, then the necessary number of measurements can be reduced by the min{m, M}. Thus, solving the joint sparsity problem does not benefit much from having multiple measurements M that may be larger than m. Furthermore, Monte Carlo simulations have been conducted for the joint sparsity reconstruction using $\ell_{2,1}$ minimization and observed that the simulations support conjecture made in the present disclosure that the reconstruction quality does not improve much when M>m. On the other hand, computational complexity increases significantly as M increases since the dimensionality of the optimization variable is N×M.

Figure 9:
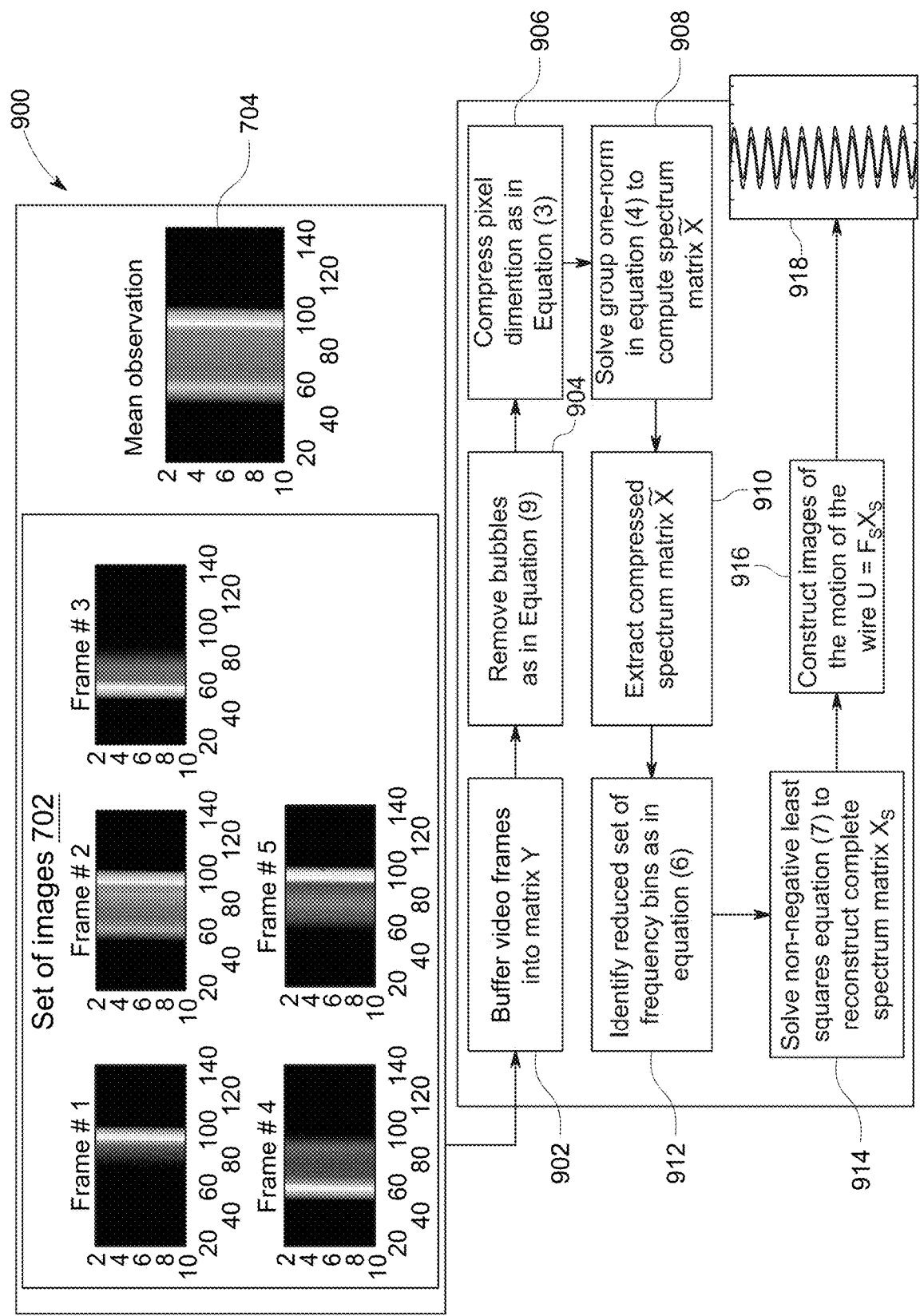
FIG. 9 illustrates an exemplary block diagram of steps used in a compressive sensing with sparse reconstruction technique to reconstruct positions of at least a segment of the wire electrode, according to some embodiments of the present disclosure.

FIG. 9 shows an exemplary block diagram 900 of steps used in a compressive sensing with sparse reconstruction technique to reconstruct positions of at least a segment of the wire electrode 104, according to embodiments of the present disclosure. The block diagram 900 includes steps 902 to 916.

At a step 902, the set of images or the video may be buffered into the matrix Y by collecting the images or video together as shown in the measured sequence Y 804. The set of images 702 may be acquired from the camera 126.

At a step 904, outliers caused by bubbles in the machining fluid 120 may be removed. In an embodiment, shadows of bubbles may be removed from the shadow of the wire electrode 104 moving across the image sensor captured in the set of images 702 acquired from the camera 126, to produce a set of bubble-free images of the wire electrode 104 encoded by the encoded illumination pattern. Details of the generation of the set of bubble-free images are provided, for example, in FIGS. 10 and 11.

At a step 906, a pixel dimension of the set of bubble-free images obtained in step 904 may be compressed to be equal to a number of images in the set of images 702 by multiplying the pixel dimension by a Gaussian random matrix to output a set of compressed images. For example, the dimensionality of the problem in equation (2) may be compressed.

It may be noted that, one of the drawbacks of the equation (2) is that it may not scale well with the number of pixels in each video frame since the optimization variable X is N×HW. However, there is also no benefit of increasing the number of measurement vectors beyond the rank of Y. Therefore, the dimensionality of the problem posed by equation (2) may be reduced or compressed by multiplying the measurements Y from the right by a random matrix $B \in \mathbb{R}^{HW \times m}$ to obtain the compressed data matrix corresponding to the set of compressed images.

$$\tilde{Y} := YB \qquad (3)$$
$$= AFXB$$
$$= AF\tilde{X}.$$

At step 908, a group one-norm sparse recovery problem may be solved to compute a spectrum matrix of the wire electrode 104 from the set of compressed images. For example, the group one-norm sparse recovery problem or the sparse least squares problem may be solved to compute the compressed spectrum matrix. The wire electrode 104 may be accompanied with vibrations while moving across the image sensor of the camera 126.

It may be noted that the support of the row norms of $\tilde{X}$ may be identical to that of X. Using the compressed observation model in equation (3), an equivalent $\ell_{2,1}$-minimization problem may be set up to equation (2) as follows:

$$\min_{\tilde{X}} \frac{1}{2} \|\tilde{Y} - AF\tilde{X}\|_F^2 + \lambda \|\tilde{X}\|_{2,1}, \qquad (4)$$

which helps in identification of the support of the compressed spectrum matrix X while operating on a significantly lower dimensional optimization variable X.

Figure 12:
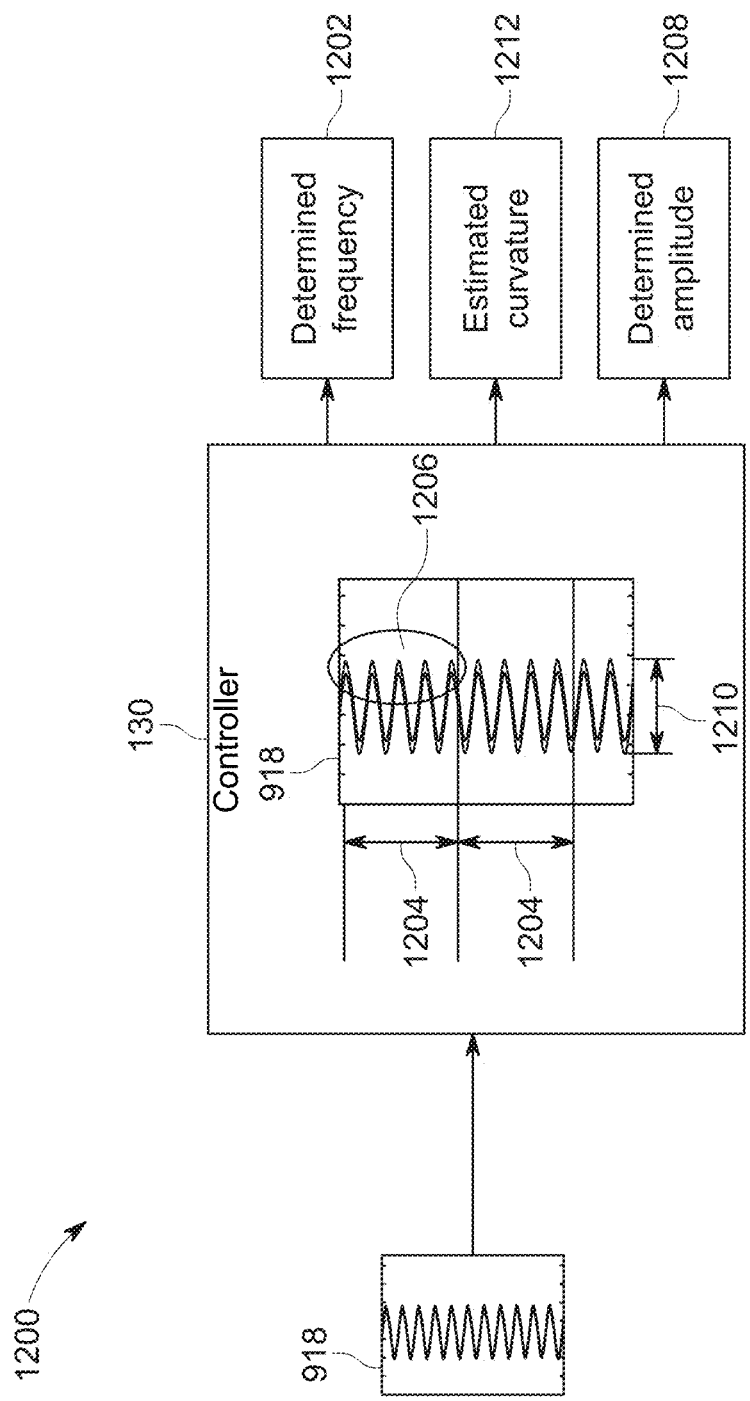
FIG. 12 illustrates an exemplary block diagram for determination of at least a frequency and an amplitude of vibration of the wire electrode, according to some embodiments of the present disclosure.

Further details for solving the group one-norm sparse recovery problem are provided, for example, in FIG. 12.

At a step 910, the compressed spectrum matrix X may be extracted. For solving the equation (3), a modified FISTA algorithm specialized for recovering row norm sparse signals is adopted. The modified FISTA algorithm for computing the compressed spectrum matrix X is as follows:

---
Algorithm 1: Modified FISTA algorithm
---
input: A, F, $\tilde{Y}$, $\lambda$, T.
set: $q_0 = 1$, $X^0 = Z^0 = 0$
1:    $\alpha \leftarrow$ inverse of eigenvalue of $F^H A^T AF$
2:    $w = F^H A^T 1$, $\bar{w} = 1 + 10|w|/\|w\|_\infty$
3:    $Q \leftarrow F^H A^+ A^{+T} F$, approximate inverse Hessian
4:    for t < 1 to T do
5:      $\hat{X}^t \leftarrow Z^{t-1} + QF^H A^T (\tilde{Y} - AFZ^{t-1})$
6:      $X^t \leftarrow prox_{\ell_{2,1}}(\hat{X}; \alpha\lambda\bar{w})$
7:      $q_t \leftarrow \frac{1 + \sqrt{1 + 4q_{t-1}^2}}{2}$
8:      $Z^t \leftarrow X^t + \frac{q_{t-1}-1}{q_t}(X^t - X^{t-1})$ Return: $\tilde{X} \leftarrow X^T$

---

In the modified FISTA algorithm, a quasi-Newton estimate $\hat{X}$ is computed for the variable $\tilde{X}$ followed by the proximal mapping function $prox_{\ell_{2,1}}(\hat{X}; \alpha\lambda\bar{w})$ with respect to a weighted $\ell_{2,1}$ norm of the estimate $\hat{X}$ using the weight vector $\bar{w}$ shown in the Algorithm. A choice of the weight vector $\bar{w} = 1 + 10|w|/\|w\|_\infty$, with $w = F^H A^T 1$ is designed to discourage non-zero coefficients in the rows of X that align with the sampling structure of the measurement operator A.

The proximal mapping function is applied row-wise and is defined as follows for each row indexed by r:

$$prox_{\ell_{2,1}}(\hat{X}(r,:); \alpha\lambda\bar{w}(r)) := \frac{\hat{X}(r,:)}{\|\hat{X}(r,:)\|_2} \cdot \max\{\|\hat{X}(r,:)\|_2 - \alpha\lambda\hat{w}(r), 0\}. \qquad (5)$$

At a step 912, a reduced set of frequency bins is identified corresponding to locations of rows of the spectrum matrix that comprises largest Euclidean norms. The compressed spectrum matrix may be utilized to identify the support of the jointly sparse signal X.

After computing the variable $\tilde{X}$ using the algorithm 1, a support set S of X may be estimated as an index set of the row-norm vector $\tilde{x}$ of $\tilde{X}$, i.e., the set of row indices that have non-zero $\ell_2$ norms:

$$S = \text{supp}(\tilde{x}), \text{ where } \tilde{x} := \sqrt{(\tilde{X} e \tilde{X}^*)}1, \qquad (6)$$

where e denotes the element-wise Hadamard product, $\tilde{X}^*$ is the element-wise complex conjugate of $\tilde{X}$, and 1 is the all ones vector.

At a step 914, a least squares reconstruction problem may be solved using the reduced set of frequency bins to reconstruct a high temporal resolution set of images of the motion of the wire electrode with a spatial resolution equal to a spatial resolution the image sensor of the camera 126. The coefficients of X restricted to the identified support set in order may be solved to reconstruct the temporally super resolved video sequence.

Once the support set S is identified, the high frame rate video $U = F_S X_S$ may be reconstructed by computing the coefficients of X restricted to the support set S. The matrix $F_S$ is the subset of the columns of the inverse Fourier matrix indexed by S. Such a matrix achieved by solving the following constrained least squares equation:

$$\min_{X_S} \frac{1}{2} \|Y - AF_S X_S\|_F^2 \text{ subject to } F_S X_S \geq 0. \qquad (7)$$

The constraint $F_S X_S \geq 0$ may ensure that every pixel in $U \in \mathbb{R}_+$ has a real, non-negative feasible pixel value, equation (7) may be solved using an accelerated projected gradient (APG) descent routine depicted in Algorithm 2.

Algorithm 2: Accelerated projected gradient (APG) for computing high frame rate video U:

---
input: A, $F_s$, Y, T.
set: $q_0 = 1$, $X_s^0 = Z^0 = 0$
1:    $\alpha \leftarrow$ inverse of eigenvalue of $F_s^H A^T AF_s$
2:    for t $\leftarrow$ 1 to T do
3:      $\hat{X}_S^t \leftarrow Z^{t-1} + \alpha F_s^H A^T (Y - AF_s Z^{t-1})$
4:      $U^t \leftarrow proj_{\mathbb{R}_+}(F_s \hat{X}_S^t)$
5:      $X_S^t \leftarrow F_s^H U^t$
6:      $q_t \leftarrow \frac{1 + \sqrt{1 + 4q_{t-1}^2}}{2}$
8:      $Z^t \leftarrow X_S^t + \frac{q_{t-1}-1}{q_t}(X_S^t - X_S^{t-1})$ Return $U \leftarrow U^T$

---

The constraint of U to the positive orthant is guaranteed through the element-wise projection operator $proj_{\mathbb{R}_+}(U)$ that may discard the imaginary component of every element of U and sets any negative real component to zero.

At a step 916, the positions of at least the segment of the wire electrode 104 may be output from the reconstructed high temporal resolution set of images 702 of the motion of the wire electrode 104. The output positions, such as positions 918 of at least the segment of the wire electrode 104 depicts the vibration of the wire electrode 104 over time.

Figure 10:
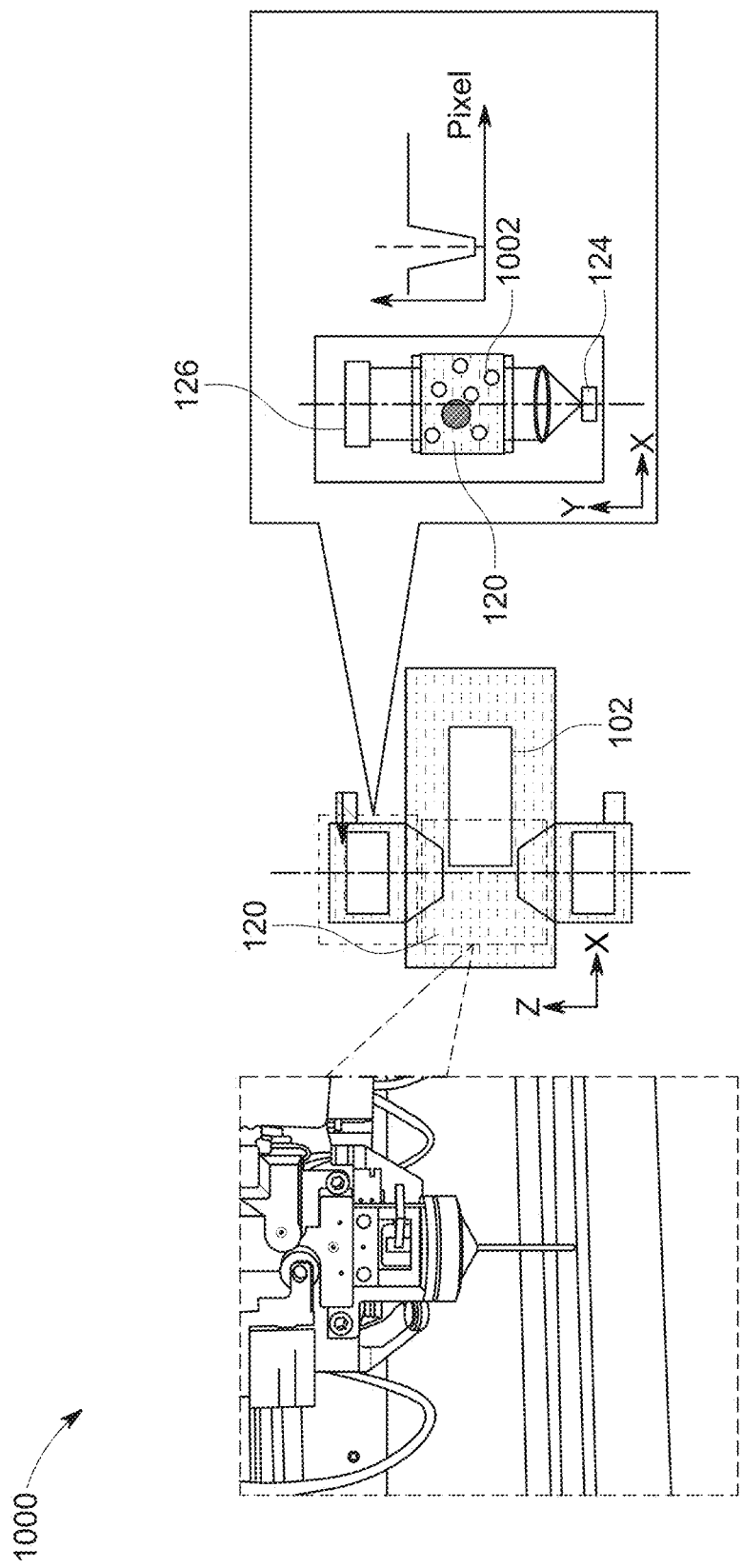
FIG. 10 illustrates a diagram that depicts presence of bubbles in a machining fluid around the wire electrode of the wire EDM, according to some embodiments of the present disclosure.

FIG. 10 illustrates a diagram that depicts presence of bubbles in the machining fluid 120 around the wire electrode 104 of the wire EDM 116, according to embodiments of the present disclosure. In practical wire EDM 116 scenarios, the wire electrode 104 may vibrate inside of the machining fluid 120 that may help in lubricating and cooling the mechanical components. The presence of the machining fluid 120 and the wire vibration often result in the occurrence of bubbles 1002, such as air bubbles that move through the machining fluid 120. Such bubbles 1002 may be captured by the video camera, such as the camera 126 and the motion induces spectral components that contaminate the spectrum of the purely vibrating wire electrode 104. Fortunately, the motion of the bubbles 1002 is not periodic and the occurrence of the bubbles 1002 in the captured video is generally transient.

Given the properties of the bubbles 1002, the presence of the bubbles 1002 may be modelled as sparse outliers in the measurement model. Let $O \in \mathbb{R}^{m \times HW}$ denote the sparse matrix of outliers corresponding to the bubbles 1002. A new forward model that accommodates the presence of bubbles 1002 may be given by:

$$Y = AFX + O. \tag{8}$$

To recover X and its support, a mechanism for handling the presence of the sparse outlier matrix O needs to be developed.

Figure 11:
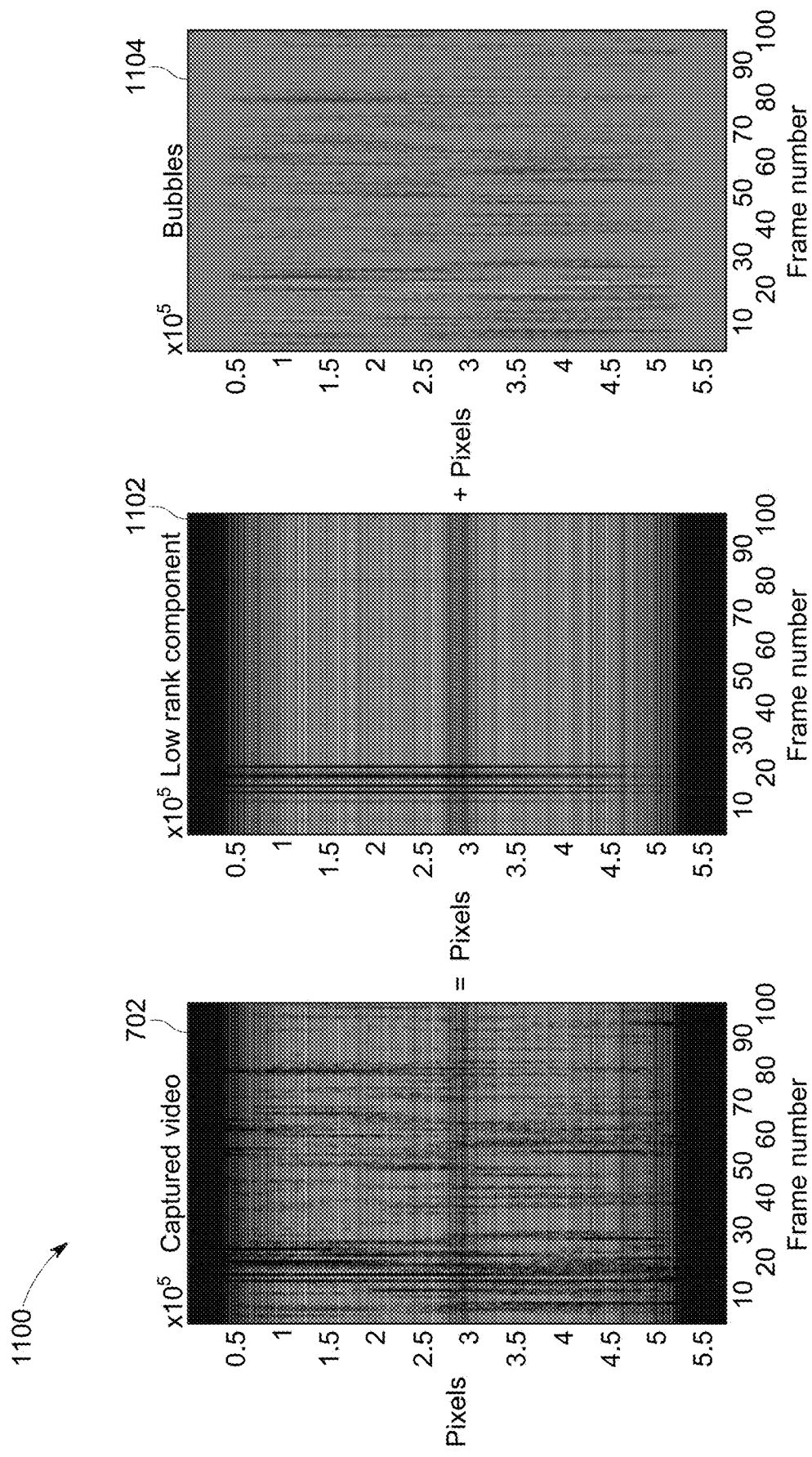
FIG. 11 illustrates a diagram representing production of a set of bubble-free images from the set of images acquired from the camera, according to some embodiments of the present disclosure.

FIG. 11 illustrates a diagram 1100 representing production of a set of bubble-free images 1102 from the set of images 702 acquired from the camera 126, according to embodiments of the present disclosure.

In an embodiment, removing of the shadows of bubbles 1002 from the set of images 702 acquired from the camera 126 to produce the set of bubble-free images 1102 is performed by solving a robust principal component analysis (PCA) problem. The further robust principal component analysis problem may include modeling the set of images 702 as being composed of a low rank matrix component and a sparse matrix component 1104. The low rank matrix component corresponds to the vibrating wire electrode 104 without bubbles 1002 (such as the set of bubble-free images 1102) and the sparse matrix component 1104 corresponds to the bubbles. The low rank matrix component may be output as the set of bubble-free images 1102.

The sparsity of the row norms of X result in the matrix L:=AFX to have a low rank. A technique for separating the sum of a low rank component and a sparse component is the robust principal component analysis (PCA). The robust PCA problem may be summarized as follows:

$$\min_{L,O} \|L\|_* + \|O\|_1 \text{ subject to } Y = L + O, \tag{9}$$

where $\|L\|_*$ denotes the nuclear norm (sum of singular values) of a matrix L, and $\|O\|_1$ is the $\ell_1$ norm of the vectorized matrix O.

In the PCA approach, the robust PCA problem may be first solved to compute the low rank matrix L. Further, the support estimation may be performed and the video reconstruction steps may be performed after replacing the matrix Y with the low rank matrix L.

In another embodiment, bubble separation may be performed by use of forward modeling. As an alternative to the robust PCA approach, the bubble separation stage may be incorporated directly into the support identification step from compressed measurements as follows:

$$\min_{\tilde{X}, O} \frac{1}{2} \|\tilde{Y} - AF\tilde{X} - OB\|_F^2 + \lambda \|\tilde{X}\|_{2,1} + \mu \|O\|_1, \tag{10}$$

where B is the dimensionality reducing random matrix.

In some embodiments, the solving of the group one-norm sparse recovery problem may be required to compute the spectrum matrix X of the wire electrode 104 from the set of compressed images. For example, a difference between the set of compressed images and the synthesized set of compressed images formed by a product of the spectrum matrix of the vibrating wire electrode 104 and the Fourier transform applied in the upsampled temporal domain may be minimized. The minimization may be depicted by use of equation (4) explained at the step 908 of FIG. 9.

Further, the minimization of the difference may be regularized by a sum of the Euclidean norms of the rows of the spectrum matrix of the vibrating wire electrode 104. Details of the minimization of the difference are further provided, for example, in algorithm 1 at the step 910 of FIG. 9.

Furthermore, the spectrum matrix may be output in the upsampled temporal domain that may be sparse in the frequency bins by having a small number of nonzero row norms. Details of the output of the spectrum matrix are further provided, for example, in algorithm 1 at the step 910 of FIG. 9.

FIG. 12 illustrates an exemplary block diagram 1200 for determination of at least a frequency and an amplitude of vibration of the wire electrode 104, according to embodiments of the present disclosure. The design of the illumination pattern and corresponding sensing matrix A has an important role in determining the reconstruction quality of the super resolved video acquired by the camera 126. Particularly, an instantiation and length of the coded illumination pattern within the duration of exposure of the video frame may impact the ability to determine an accurate signal support.

When the coded illumination patterns $a_i$ are triggered at uniformly spaced intervals, the measurement operator A may exhibit the sparse spectrum in the frequency domain, that may not be distinguishable from the support of the reconstructed signal U. Alternatively, we may allow the strobing sequence to occupy a random starting position in the frame exposure interval). Such an approach may help in breaking the periodicity of the sampling operator and results in a relatively flatter spectrum that may not exhibit the high valued coefficients at harmonic frequencies.

In some embodiments, the controller 130 may be further configured to determine a frequency 1202 of vibration of the wire electrode 104 by converting a reduced set of frequency bins to a physical frequency value. The controller 130 may receive the positions 918 of at least the segment of the wire electrode 104 as an input. The controller 130 may divide the segment of the wire electrode 104 in one or more time blocks 1204. The frequency 1202 of vibration of the wire electrode 104 may be determined based on a number of oscillations or peaks 1206 of the wire electrode 104 in each time block of the one or more time blocks 1204. For example, the determined frequency may be equal to the number of oscillations of the wire electrode 104.

The controller 130 may be further configured to determine an amplitude 1208 of vibration of the wire electrode 104 by converting the positions of the segments of the wire electrode 104 on a sensor array to a physical position of the wire electrode 104 according to a geometry of components of the wire electrode position measurement system 122. The amplitude 1208 may be determined based on a calculation of a length 1210 of the segment of the wire electrode 104.

In an embodiment, the controller 130 may be further configured to determine a curvature 1212 of the vibration of the wire electrode 104. The curvature 1212 may be determined based on locations of the peaks 1206 of the wire electrode 104 in each time block of the one or more time blocks 1204. The exact frequency 1202, the amplitude 1208 and the curvature 1212 of the wire electrode 104 are determined from the reconstructed high temporal resolution video of the wire electrode 104 to control the quality of the cut.

Figure 13:
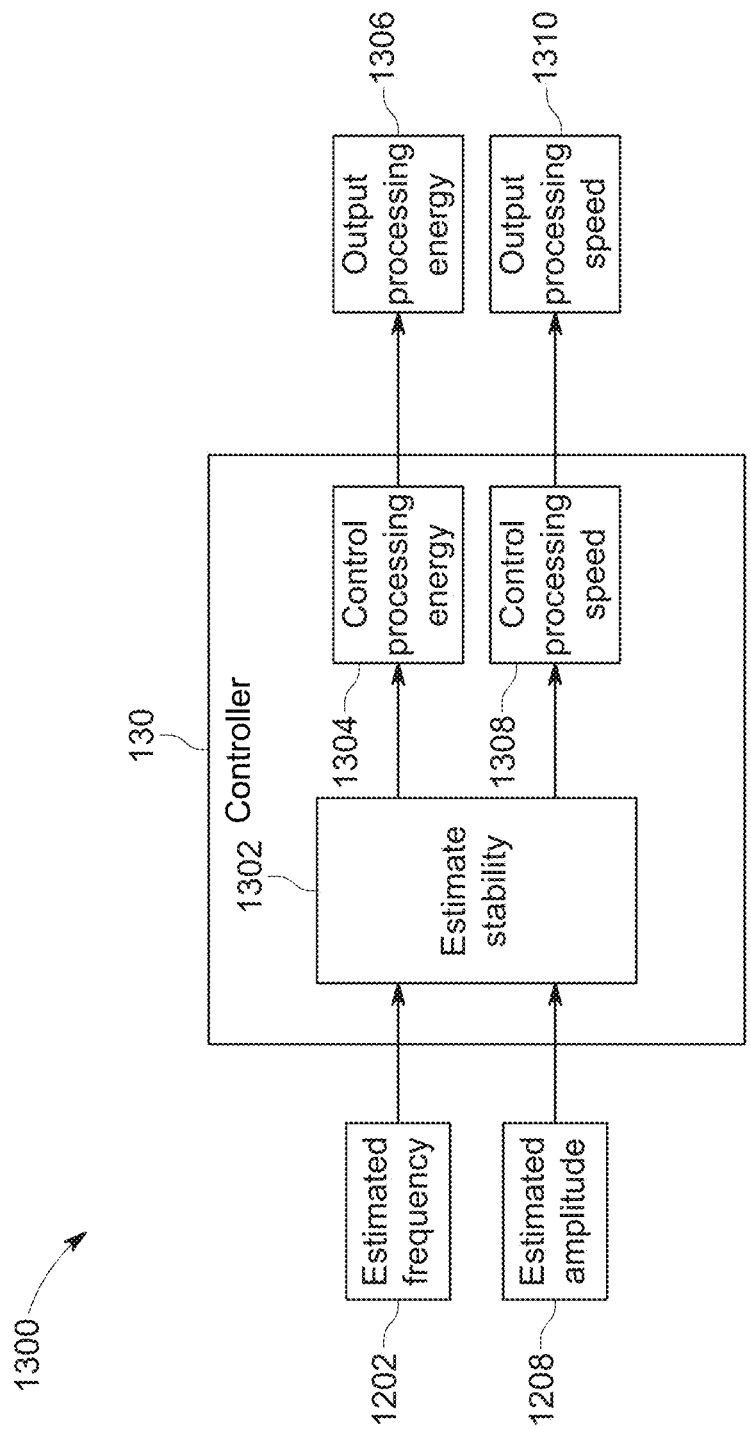
FIG. 13 illustrates an exemplary block diagram for reducing a possibility of breakage of the wire electrode during a rough cut, according to some embodiments of the present disclosure.

FIG. 13 illustrates an exemplary block diagram 1300 for reducing a possibility of breakage of the wire electrode 104 during a rough cut, according to embodiments of the present disclosure. In the rough cut technique, wire breakage is the most common issue. When the amplitude of the wire vibration increases or the frequency of vibration fluctuates greatly during processing, the processing is considered to be unstable, and the possibility of wire breakage may be increased.

In some embodiments, the controller 130 may be further configured to reduce the possibility of breakage of the wire electrode during the rough cut by performing control actions.

At a step 1302, the controller 130 may estimate the stability of the wire electrode 104. The control action may be based on analysis of the determined frequency 1202 and the amplitude 1208 of vibration of the wire electrode 104 for noticeable changes.

At a step 1304, the control action may be based on reduction of a processing energy input to the wire electrode 104, based on a detection of one or more noticeable change, such as based on the determined frequency 1202 and the amplitude 1208 of vibration of the wire electrode 104. At a step 1306, the reduced processing energy is output by the controller 130.

At a step 1308, the control action may be based on reduction in a processing speed of the workpiece 102 and the delivery system 118, based on the detection of the one or more noticeable changes, such as based on the determined frequency 1202 and the amplitude 1208 of vibration of the wire electrode 104. At a step 1310, the reduced processing speed of the workpiece 102 and the delivery system 118 may be output by the controller 130. Further, the machining energy is controlled by controlling the machining current and the pause time.

Figure 14:
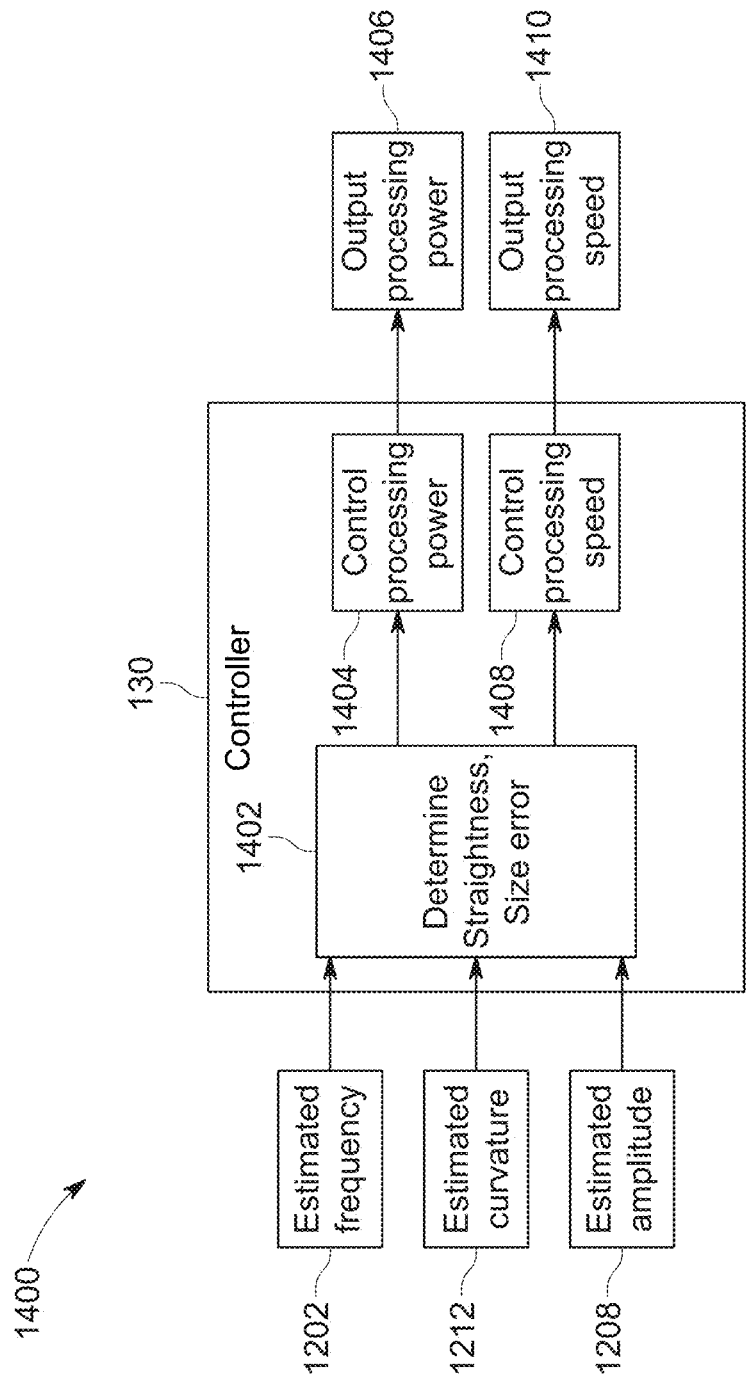
FIG. 14 illustrates an exemplary block diagram for control of an amount of straightness and a size error of a cut during a skim cut, according to some embodiments of the present disclosure.

FIG. 14 illustrates an exemplary block diagram 1400 for control of an amount of straightness and a size error of a cut during a skim cut, according to embodiments of the present disclosure. In some embodiments, the controller 130 may be further configured to control the amount of straightness and the size error of the cut during the skim cut by performing control actions.

With regard to the skim cut, the processing energy is smaller than that of rough cut, thus a possibility of the wire breaking is reduced, but on the other hand, the deterioration of straightness, streaks, and size error may cause a concern. The controller 130 may utilize the frequency 1202, the curvature 1212 and the amplitude 1208 to control the processing power and processing speed.

It may be noted that the straightness refers to a straightness of the machined surface, such as the workpiece 102 in the vertical direction, and streaks refers to the streaks generated on the machined surface. The straightness may be predicted by the amplitude 1208 of wire vibration as the shape is such that the amplitude 1208 of the wire vibration is transferred to the workpiece 102. When the amplitude 1208 of the wire vibrations are small, the straightness is better, and when vibrations are large, the straightness is worse. Due to such physical phenomena, the straightness may further be controlled by the processing speed and electrical conditions.

At a step 1402, the control actions may be based on an analysis of the amplitude 1208 of wire vibration to detect the amplitude 1208 to be larger than a threshold. For example, the threshold may be defined based on acceptable limit of vibrations in the wire electrode 104. The amplitude 1208 determined to be larger than the threshold may determine that the vibrations in the wire electrode 104 may be large and thus, may cause inaccurate cut. In an embodiment, the controller 130 may receive the frequency 1202, the curvature 1212 and the amplitude 1208 as an input to control the amount of the straightness and the size error of the cut during the Skim Cut.

At a step 1406, the control actions may be based on control of the processing power. In an embodiment, the control actions may be based on increase in a machining energy when the wire electrode 104 is away from the workpiece 102 and decrease in the machining energy when the wire electrode 104 is closer to the workpiece 102. The accuracy of the size error may be improved by controlling the machining energy. At a step 1406, the controlled processing power may be output by the controller 130.

At a step 1408, the control actions may be based on control of the processing speed of the workpiece 102 and the delivery system 118. In an embodiment, the actions may be based on reduction in a processing speed of the workpiece 102 and the delivery system 118 to reduce the amplitude 1208 of the vibration in the wire electrode 104 when a shape of the wire electrode 104 is estimated to be a convex shape. When the processing speed is slowed down, the explosive force caused by the electrical discharge weakens as the discharge frequency decreases, and the electrical electrostatic attraction generated between the wire electrode 104 and the workpiece 102 may become dominant, causing the wire electrode 104 to deflect in the direction of approaching the workpiece 102, resulting in a concave straightness of the machined surface. In another embodiment, the actions may be based on increase in the processing speed of the workpiece 102 and the delivery system 118 to increase the amplitude 1208 of the vibration in the wire electrode 104 when the shape of the wire electrode 104 is estimated to be a concave shape. When the processing speed is increased, the discharge frequency increases and the explosive force due to the discharge greatly acts on the wire electrode 104, such that the wire electrode 104 bends in the direction away from the workpiece 102 and the machined surface has a convex straightness accuracy. At a step 1410, the controlled processing speed may be output by the controller 130.

Therefore, the straightness accuracy may be improved to control the processing speed and electrical conditions according to the aspect of wire vibration. It is possible to improve the accuracy of the size error by the same machining control as Straightness. Further, regarding the size error, it may be possible to change the machining locus itself such as to match the desired shape based on the measured wire position.

Figure 15:
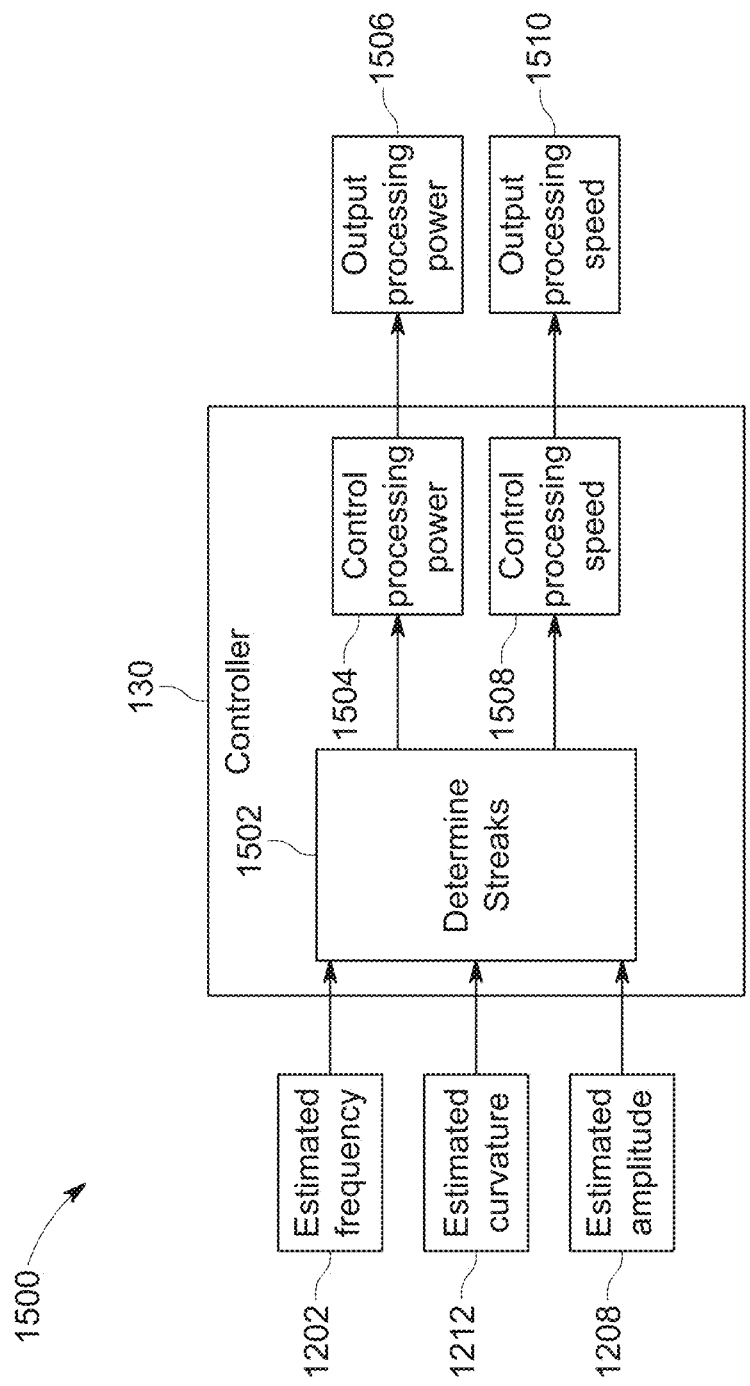
FIG. 15 illustrates an exemplary block diagram for control of streaks of a cut during a Skim Cut, according to embodiments of the present disclosure.

FIG. 15 illustrates an exemplary block diagram 1500 for control of streaks of the cut during the skim cut, according to embodiments of the present disclosure. In some embodiments, the controller 130 may be further configured to control streaks of a cut during a skim cut by performing control actions.

At a step 1502, the control actions may be based on an analysis of the amplitude 1208 of vibration to detect a fluctuation in the vibration of the wire electrode 104. In order to control of streaks, it may be necessary to suppress the vibration component of the wire electrode 104. In order to suppress the vibration component of the wire electrode 104, machining control such as suppressing the fluctuation of the processing speed or increasing the tension of the wire may be considered as explained in subsequent steps. In an embodiment, the controller 130 may receive the frequency 1202, the curvature 1212 and the amplitude 1208 as an input to control the streaks.

At a step 1504, the control actions may be based on control of the machining energy. In an embodiment, the control actions may be based on increase in the machining energy when the wire electrode 104 is away from the workpiece 102 and decrease in the machining energy when the wire electrode 104 is closer to the workpiece 102. At a step 1506, the controlled machining energy may be output by the controller 130.

At a step 1508, the control actions may be based on control of the processing speed of the workpiece 102 and the delivery system 118. In an embodiment, the control actions may be based on reduction in the processing speed of the workpiece 102 and the delivery system 118 to reduce the amplitude 1208 of the vibration in the wire electrode 104 when the shape of the wire electrode 104 is estimated to be the convex shape. In another embodiment, the control actions may be based on increase in the processing speed of the workpiece 102 and the delivery system 118 to increase the amplitude 1208 of the vibration in the wire electrode 104 when the shape of the wire electrode 104 is estimated to be the concave shape.

Figure 16:
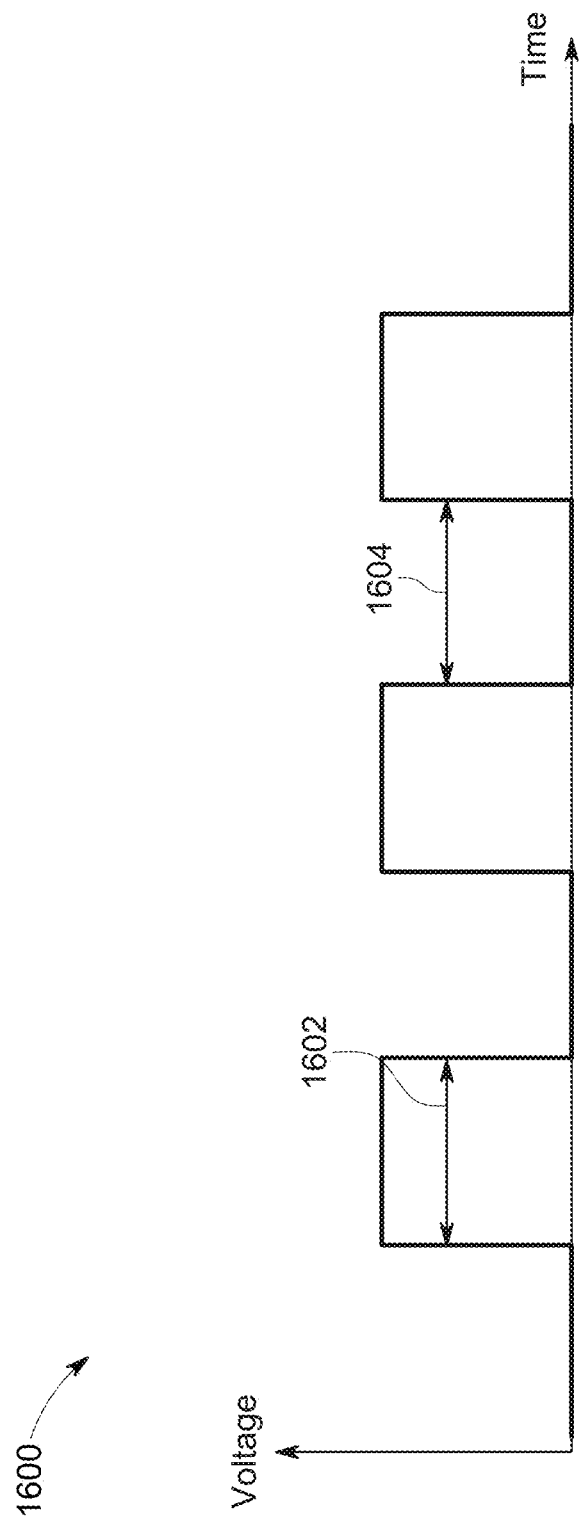
FIG. 16 illustrates a waveform generated by an energy source, according to some embodiments of the present disclosure.

Further, the control of the energy source 108 based on the positions of at least the segment of the wire electrode 104 reconstructed at the reconstruction rate, by the controller 130 are provided, for example, in FIG. 16.

FIG. 16 shows a waveform 1600 generated by the energy source 108, according to some embodiments of the present disclosure. The energy source 108 is further configured to generate the waveform 1600 composed of a sequence of ON time and OFF time voltage pulses. The generated waveform 1600 may be depict the electric voltage on X-axis and time on Y-axis. The sequence of ON time and OFF time voltage pulses includes alternate ON time voltage pulses 1602 and OFF time voltage pulses 1604.

A processing energy is reduced by shortening a duration of the ON time voltage pulses or by extending a duration of the OFF time voltage pulses. When a pause time is extended or the duration of the ON time voltage pulses is shortened, the ON time per unit time is reduced, that may lead to reduction in the processing energy.

The processing energy is increased by extending the duration of the ON time voltage pulses or by shortening the duration of the OFF time voltage pulses. When duration of the OFF time voltage pulses is shortened, the OFF time per unit time is reduced, that may lead to increase in the processing energy.

The processing energy is kept constant, and a voltage feedback control is applied to control the processing speed of the workpiece 102. The voltage feedback control is employed to control the speed such that the machining voltage remains constant. Furthermore, the processing speed may be controlled such that processing speed becomes faster when a target value of the machining voltage is reduced and slower when the machining voltage is increased. In addition, the current may be controlled in order to control the machining energy.

Figure 17:
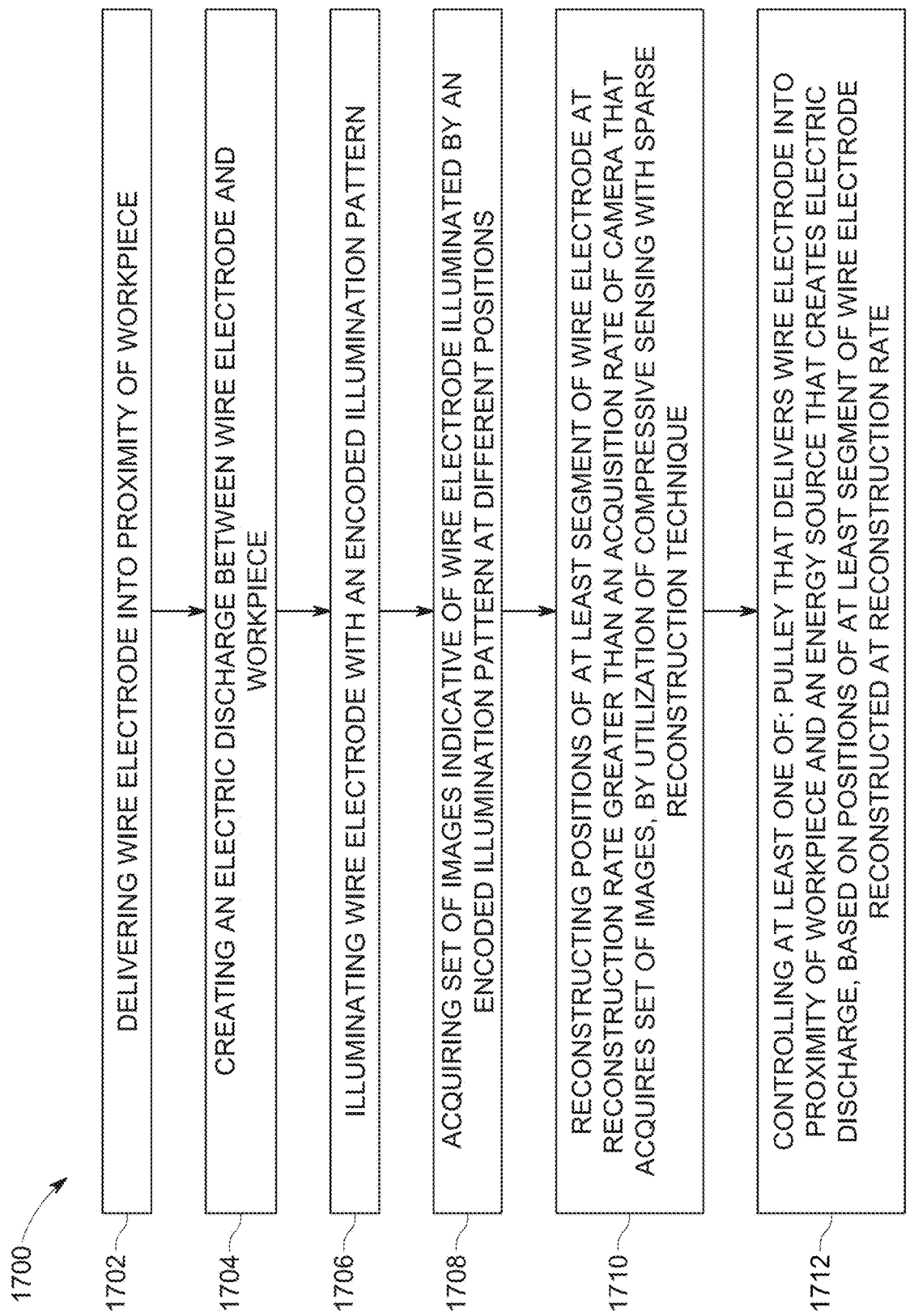
FIG. 17 illustrates a flow chart depicting a method for machining a workpiece, according to some embodiments of the present disclosure.

FIG. 17 shows a flow chart 1700 depicting a method for machining the workpiece 102, according to some embodiments of the present disclosure.

At a step 1702, the method for machining the workpiece 102 may include delivering the wire electrode 104 into proximity of the workpiece 102. The wire electrode 104 may be utilized for machining the workpiece 102. Details of the delivery of the wire electrode 104 into proximity of the workpiece 102 are provided, for example, in FIG. 1B.

At a step 1704, the method for machining the workpiece 102 may include creating the electric discharge between the wire electrode 104 and the workpiece 102. The electric discharge may be required for the removal of the metal from the workpiece 102. Details of the creating of the electric discharge between the wire electrode 104 and the workpiece 102 are provided, for example, in FIG. 1B.

At a step 1706, the method for machining the workpiece 102 may include illuminating the wire electrode 104 with the encoded illumination pattern. The encoded illumination pattern may generate the constant illumination pattern or the pseudorandom sequence of ON and OFF light pulses. Details of the generation of the constant illumination pattern or the pseudorandom sequence of ON and OFF light pulses are provided, for example, in FIGS. 1B, 4B and 4C.

At a step 1708, the method for machining the workpiece 102 may include acquiring the set of images 702 indicative of the wire electrode illuminated by the encoded illumination pattern at different positions. The set of images 702 may be captured by the camera 126. Details of the acquisition of the set of images 702 are provided, for example, in FIG. 1B.

At a step 1710, the method for machining the workpiece 102 may include reconstructing positions of at least the segment of the wire electrode 104 at the reconstruction rate greater than the acquisition rate of the camera 126 that acquires the set of images 702, by utilization of compressive sensing with sparse reconstruction technique. Details of the reconstruction of the positions of at least the segment of the wire electrode 104 are provided, for example, in FIGS. 1B and 9.

At a step 1712, the method for machining the workpiece 102 may include controlling at least one of the delivery system 118 that delivers the wire electrode 104 into proximity of the workpiece 102 and the energy source 108 that creates the electric discharge, based on the positions of at least the segment of the wire electrode 104 reconstructed at the reconstruction rate. Details of the control of the delivery system 118 and the energy source 108 are provided, for example, in FIG. 1B, FIG. 14, FIG. 15 and FIG. 16.

Many modifications and other embodiments of the inventions set forth herein will come to mind to one skilled in the art to which these inventions pertain having the benefit of the teachings presented in the foregoing descriptions and the associated drawings. It is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A wire electric discharge machine (EDM) for machining a workpiece, the wire EDM comprising:
   a delivery system in contact with one or a combination of a wire electrode and the workpiece for delivering the wire electrode and the workpiece into proximity of each other;
   an energy source configured to create an electric discharge between the wire electrode and the workpiece;
   a wire electrode position measurement system comprising:
      a light source configured to illuminate the wire electrode with an encoded illumination pattern; and
      a camera having an image sensor arranged to acquire a set of images indicative of the wire electrode illuminated by the encoded illumination pattern at different positions;
   a processor configured to reconstruct positions of at least a segment of the wire electrode at a reconstruction rate greater than an acquisition rate of the camera by utilization of compressive sensing with sparse reconstruction; and
   a controller configured to control at least one of: the delivery system and the energy source based on the positions of at least the segment of the wire electrode reconstructed at the reconstruction rate.

2. The wire EDM of claim 1, wherein the energy source is further configured to generate a waveform composed of a sequence of ON time voltage pulses and OFF time voltage pulses, and wherein
   a processing energy is reduced by shortening a duration of the ON time voltage pulses or by extending a duration of the OFF time voltage pulses;
   the processing energy is increased by extending the duration of the ON time voltage pulses or by shortening the duration of the OFF time voltage pulses; and
   the processing energy is kept constant and a voltage feedback control is applied to control a processing speed of the workpiece.

3. The wire EDM of claim 1, wherein the image sensor is two-dimensional (2D) sensor capturing the segment of the wire including multiple points, wherein the encoded illumination pattern of the light source is configured to generate a pseudorandom sequence of ON and OFF light pulses, and wherein
   a duration of each pulse of the pseudorandom sequence of ON and OFF light pulses is smaller than or equal to a Nyquist sampling rate of a frequency of vibration of the wire electrode; and
   a total duration of the pseudorandom sequence of the ON and OFF light pulses is less than or equal to a duration of a frame exposure of the camera.

4. The wire EDM of claim 1, wherein the light source and the camera of the wire electrode position measurement unit are arranged at opposite sides of the wire electrode, and wherein the image sensor of the camera is configured to acquire the set of images of a summation of shadows of the wire electrode encoded by the illumination pattern as the wire electrode moves across the 2D sensor of the camera.

5. The wire EDM of claim 1, wherein the compressive sensing with sparse reconstruction comprises:
   buffering the set of images acquired from the camera;
   removing shadows of bubbles from a shadow of the wire electrode moving across the image sensor captured in the set of images acquired from the camera, to produce a set of bubble-free images of the wire electrode encoded by the encoded illumination pattern;
   compressing a pixel dimension of the set of bubble-free images to be equal to a number of images in the set of images by multiplying the pixel dimension by a Gaussian random matrix to output a set of compressed images;
   solving a group one-norm sparse recovery problem to compute a spectrum matrix of the wire electrode from the set of compressed images, wherein the wire electrode is accompanied with vibrations while moving across the image sensor;
   identifying a reduced set of frequency bins corresponding to locations of rows of the spectrum matrix that comprises largest Euclidean norms;
   solving a least squares reconstruction problem using the reduced set of frequency bins to reconstruct a high temporal resolution set of images of the motion of the wire electrode with a spatial resolution equal to a spatial resolution the image sensor of the camera; and
   outputting the positions of at least the segment of the wire electrode from the reconstructed high temporal resolution set of images of the motion of the wire electrode.

6. The wire EDM of claim 5, wherein the removing of the shadows of bubbles from the set of images acquired from the camera to produce the set of bubble-free images is performed by solving a robust principal component analysis problem, further comprising:
   modeling the set of images as being composed of a low rank matrix component and a sparse matrix component, wherein the low rank matrix component corresponds to the vibrating wire electrode without bubbles and the sparse component corresponds to the bubbles; and
   outputting the low rank matrix component as the set of bubble-free images.

7. The wire EDM of claim 5, wherein the solving the group one-norm sparse recovery problem comprises:
   minimizing a difference between the set of compressed images and a synthesized set of compressed images formed by a product of the spectrum matrix of the vibrating wire electrode and a Fourier transform applied in an upsampled temporal domain;
   regularizing the minimization of the difference by a sum of the Euclidean norms of the rows of the spectrum matrix of the vibrating wire electrode; and
   outputting the spectrum matrix in the upsampled temporal domain that is sparse in the frequency bins by having a small number of nonzero row norms.

8. The wire EDM of claim 1, wherein the controller is further configured to determine at least one of:
   a frequency of vibration of the wire electrode by converting a reduced set of frequency bins to a physical frequency value; and
   an amplitude of vibration of the wire electrode by converting the positions of the segments of the wire electrode on a sensor array to a physical position of the wire electrode according to a geometry of components of the wire electrode position measurement unit.

9. The wire EDM of claim 8, wherein the controller is further configured to reduce a possibility of breakage of the wire electrode during a rough cut by performing one or more control actions based on:
- analysis of the determined frequency and amplitude of vibration of the wire electrode for noticeable changes;
- reduction of a processing energy input to the wire electrode, based on a detection of the one or more noticeable change; and
- reduction in a processing speed of the workpiece and the delivery system, based on the detection of the one or more noticeable changes.

10. The wire EDM of claim 8, wherein the controller is further configured to control an amount of straightness and a size error of a cut during a skim cut by performing control actions based on:
- analysis of the amplitude of wire vibration to detect the amplitude to be larger than a threshold;
- reduction in a processing speed of the workpiece and the delivery system to reduce the amplitude of the vibration in the wire electrode when a shape of the wire electrode is estimated to be a convex shape;
- increase in a processing speed of the workpiece and the delivery system to increase the amplitude of the vibration in the wire electrode when the shape of the wire electrode is estimated to be a concave shape; and
- change a machining energy according to a distance between the wire electrode and the workpiece.

11. The wire EDM of claim 8, wherein the controller is further configured to control streaks of a cut during a Skim Cut by performing control actions based on:
- analysis of the amplitude of vibration to detect a fluctuation in the vibration of the wire electrode;
- reduction in a processing speed of the workpiece and the delivery system to reduce the amplitude of the vibration in the wire electrode when a shape of the wire electrode is estimated to be a convex shape;
- increase in the processing speed of the workpiece and the delivery system to increase the amplitude of the vibration in the wire electrode when the shape of the wire electrode is estimated to be a concave shape; and
- change a machining energy according to a distance between the wire electrode and the workpiece.

12. A method for machining a workpiece, comprising:
- delivering a wire electrode into proximity of the workpiece;
- creating an electric discharge between the wire electrode and the workpiece;
- illuminating the wire electrode with an encoded illumination pattern;
- acquiring a set of images indicative of the wire electrode illuminated by an encoded illumination pattern at different positions;
- reconstructing positions of at least a segment of the wire electrode at a reconstruction rate greater than an acquisition rate of a camera that acquires the set of images, by utilization of compressive sensing with sparse reconstruction; and
- controlling at least one of: a delivery system that delivers the wire electrode into proximity of the workpiece and an energy source that creates the electric discharge, based on the positions of at least the segment of the wire electrode reconstructed at the reconstruction rate.

13. The method of claim 12, further comprising generating a waveform composed of a sequence of ON time voltage pulses and OFF time voltage pulses, wherein

- a processing energy is reduced by shortening a duration of the ON time voltage pulses or by extending a duration of the OFF time voltage pulses;
- the processing energy is increased by extending the duration of the ON time voltage pulses or by shortening the duration of the OFF time voltage pulses; and
- the processing energy is kept constant and a voltage feedback control is applied to control a processing speed of the workpiece.

14. The method of claim 12, further comprising generating a pseudorandom sequence of ON and OFF light pulses, wherein
- a duration of each pulse of the pseudorandom sequence of ON and OFF light pulses is smaller than or equal to a Nyquist sampling rate of a frequency of vibration of the wire electrode; and
- a total duration of the pseudorandom sequence of the ON and OFF light pulses is less than or equal to a duration of a frame exposure of the camera.

15. The method of claim 12, further comprising acquiring the set of images of a summation of shadows of the wire electrode encoded by the illumination pattern as the wire electrode moves across an image sensor of the camera, wherein the light source and the camera of the wire electrode position measurement unit are arranged at opposite sides of the wire electrode.

16. The method of claim 12, wherein the compressive sensing with sparse reconstruction comprises:
- buffering the set of images acquired from the camera;
- removing shadows of bubbles from a shadow of the wire electrode moving across an image sensor captured in the set of images acquired from the camera, to produce a set of bubble-free images of the wire electrode encoded by the encoded illumination pattern;
- compressing a pixel dimension of the set of bubble-free images to be equal to a number of images in the set of images by multiplying the pixel dimension by a Gaussian random matrix to output a set of compressed images;
- solving a group one-norm sparse recovery problem to compute a spectrum matrix of the wire electrode from the set of compressed images, wherein the wire electrode is accompanied with vibrations while moving across the 2D sensor;
- identifying a reduced set of frequency bins corresponding to locations of rows of the spectrum matrix that comprises largest Euclidean norms;
- solving a least squares reconstruction problem using the reduced set of frequency bins to reconstruct a high temporal resolution set of images of the motion of the wire electrode with a spatial resolution equal to a spatial resolution the image sensor of the camera; and
- outputting the positions of at least the segment of the wire electrode from the reconstructed high temporal resolution set of images of the motion of the wire electrode.

17. The method of claim 16, wherein the removing of the shadows of bubbles from the set of images to produce the set of bubble-free images further comprises solving a robust principal component analysis problem, the solving further comprises:
- modeling the set of images as being composed of a low rank matrix component and a sparse matrix component, wherein the low rank matrix component corresponds to the vibrating wire electrode without bubbles and the sparse component corresponds to the bubbles; and
- outputting the low rank matrix component as the set of bubble-free images.

18. The method of claim 16, wherein the solving the group one-norm sparse recovery problem comprises:
- minimizing a difference between the set of compressed images and a synthesized set of compressed images formed by a product of the spectrum matrix of the vibrating wire electrode and a Fourier transform applied in an upsampled temporal domain;
- regularizing the minimization of the difference by a sum of the Euclidean norms of the rows of the spectrum matrix of the vibrating wire electrode; and
- outputting the spectrum matrix in the upsampled temporal domain that is sparse in the frequency bins by having a small number of nonzero row norms.

19. The method of claim 12, further comprising determining at least one of:
- a frequency of vibration of the wire electrode by converting a reduced set of frequency bins to a physical frequency value; and
- an amplitude of vibration of the wire electrode by converting the positions of the segments of the wire electrode on a sensor array to a physical position of the wire electrode according to a geometry of components of the wire electrode position measurement unit.

20. A non-transitory computer-readable medium storing computer-executable instructions for machining a workpiece, the computer-executable instructions configured for:
- delivering a wire electrode into proximity of a workpiece;
- creating an electric discharge between the wire electrode and the workpiece;
- illuminating the wire electrode with an encoded illumination pattern;
- acquiring a set of images indicative of the wire electrode illuminated by an encoded illumination pattern at different positions;
- reconstructing positions of at least a segment of the wire electrode at a reconstruction rate greater than an acquisition rate of a camera that acquires the set of images, by utilization of compressive sensing with sparse reconstruction; and
- controlling at least one of: a delivery system that delivers the wire electrode into proximity of the workpiece and an energy source that creates the electric discharge, based on the positions of at least the segment of the wire electrode reconstructed at the reconstruction rate.

* * * * *